US012143818B2

(12) United States Patent
Lee et al.

(10) Patent No.: US 12,143,818 B2
(45) Date of Patent: Nov. 12, 2024

(54) ELECTRONIC DEVICE AND METHOD FOR PERFORMING PEER TO PEER SERVICE IN ELECTRONIC DEVICE

(71) Applicant: Samsung Electronics Co., Ltd., Suwon-si (KR)

(72) Inventors: Sangyoun Lee, Suwon-si (KR); Yongju Kim, Suwon-si (KR); Seongjun Lee, Suwon-si (KR); Hyomoon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/882,212

(22) Filed: Aug. 5, 2022

(65) Prior Publication Data
US 2022/0377553 A1 Nov. 24, 2022

Related U.S. Application Data

(63) Continuation of application No. PCT/KR2021/001738, filed on Feb. 9, 2021.

(30) Foreign Application Priority Data

Feb. 10, 2020 (KR) .................. 10-2020-0015937
Feb. 11, 2020 (KR) .................. 10-2020-0016684

(51) Int. Cl.
*H04W 12/06* (2021.01)
*H04L 9/30* (2006.01)
(Continued)

(52) U.S. Cl.
CPC .......... *H04W 12/069* (2021.01); *H04L 9/3066* (2013.01); *H04W 12/041* (2021.01); *H04W 12/0471* (2021.01)

(58) Field of Classification Search
CPC ............. H04W 12/069; H04W 12/041; H04W 12/0471; H04W 12/108; H04W 12/122;
(Continued)

(56) References Cited

U.S. PATENT DOCUMENTS 10,149,159 B1 * 12/2018 Perfitt ................... H04L 9/3265
10,326,797 B1 * 6/2019 Murray ................. H04L 9/0825
(Continued)

FOREIGN PATENT DOCUMENTS

KR 10-2016-0054552 A 5/2016
KR 10-2019-0030210 A 3/2019

OTHER PUBLICATIONS

Extended European Search Report dated Oct. 5, 2023, issued in European Patent Application No. 21753239.9.
(Continued)

*Primary Examiner* — Harunur Rashid
(74) *Attorney, Agent, or Firm* — Jefferson IP Law, LLP

(57) ABSTRACT

An electronic device and a method for performing a peer to peer (P2P) service in the electronic device are provided. The electronic device includes a communication module, a processor, a memory, and a security module, wherein the memory may be configured to store instructions that, when executed, enable the processor to receive a public key from an external electronic device as a P2P service is requested, transmit, to the external electronic device, an authentication certificate chain generated on the basis of the received public key via the security module, verify an authentication certificate chain received from the external electronic device by using a root authentication certificate stored in the security module, receive encrypted information of the external electronic device from the external electronic device, decrypt the encrypted information of the external electronic device by using a shared key generated according to a result of the verifying of the received authentication certificate chain, and perform the P2P service with the external electronic device via the communication module, on the basis of the decoded information of the external electronic device.

7 Claims, 21 Drawing Sheets

(51) Int. Cl.
*H04W 12/041* (2021.01)
*H04W 12/0471* (2021.01)
*H04W 12/069* (2021.01)

(58) Field of Classification Search
CPC .......... H04W 12/50; H04L 9/3066; H04L 2209/805; H04L 9/0841; H04L 9/0897; H04L 9/3268; H04L 63/062; H04L 63/0823; H04L 63/0869; H04L 65/1069; G06F 21/445
See application file for complete search history.

(56) References Cited

U.S. PATENT DOCUMENTS

| | | | | |
|---|---|---|---|---|
| 2005/0177715 | A1* | 8/2005 | Somin | H04L 67/1046 713/156 |
| 2009/0257595 | A1* | 10/2009 | de Cesare | G06F 21/575 726/16 |
| 2013/0016840 | A1 | 1/2013 | Willey et al. | |
| 2016/0234768 | A1 | 8/2016 | Sato | |
| 2016/0344712 | A1* | 11/2016 | Ding | H04L 63/061 |
| 2017/0006117 | A1* | 1/2017 | Kafle | H04L 65/612 |
| 2017/0280324 | A1 | 9/2017 | Beals | |
| 2018/0027458 | A1 | 1/2018 | Mohan et al. | |
| 2018/0183596 | A1 | 6/2018 | Deshpande et al. | |
| 2018/0324156 | A1* | 11/2018 | Mu | H04W 4/80 |
| 2019/0260660 | A1* | 8/2019 | Abuan | H04W 12/04 |
| 2019/0268749 | A1 | 8/2019 | Jiang et al. | |
| 2019/0364425 | A1* | 11/2019 | Schlack | H04W 12/06 |
| 2020/0036702 | A1* | 1/2020 | Tempel | H04L 63/0464 |

OTHER PUBLICATIONS

European Search Report dated Jun. 30, 2023, issued in European Patent Application No. 21753239.9.

* cited by examiner

ELECTRONIC DEVICE AND METHOD FOR PERFORMING PEER TO PEER SERVICE IN ELECTRONIC DEVICE

CROSS-REFERENCE TO RELATED APPLICATION(S)

This application is a continuation application, claiming priority under § 365(c), of an International application No. PCT/KR2021/001738, filed on Feb. 9, 2021, which is based on and claims the benefit of a Korean patent application number 10-2020-0015937, filed on Feb. 10, 2020, in the Korean Intellectual Property Office, and of a Korean patent application number 10-2020-0016684, filed on Feb. 11, 2020, in the Korean Intellectual Property Office, the disclosure of each of which is incorporated by reference herein in its entirety.

BACKGROUND

1. Field

The disclosure relates to facilitating device search and connection between electronic devices having mixed heterogeneous communication schemes and performing a peer to peer (P2P) service safely in an appropriate communication scheme.

2. Description of Related Art

In general, electronic devices are equipped with a short-range communication technology such as Bluetooth, near field communication (NFC), or wireless fidelity (Wi-Fi), and typical examples of P2P services between electronic devices include a file transmission, a mobile hotspot connection, or a music share. In order to use a P2P service, a user may identify in advance what communication scheme is used in the corresponding service. For example, the file transmission is subdivided into Bluetooth file transmission, Android Beam™ using NFC, send to device by using Bluetooth low energy (BLE) and Wi-Fi, or Wi-Fi direct.

In the case of a P2P service based on short-range communication, users are authenticated by comparing telephone numbers. For example, partial data of a hashed telephone number may be transmitted together with a cyclical redundancy check (CRC) and may be compared with hash information stored in the counterpart device such that, according to whether they match, users can be authenticated.

The above information is presented as background information only to assist with an understanding of the disclosure. No determination has been made, and no assertion is made, as to whether any of the above might be applicable as prior art with regard to the disclosure.

SUMMARY

Various P2P services may be devised to provide services based on short-range communication schemes and may include service or communication characteristics dependent on communication schemes. As a result, with regard to services having the same character, redundant service or communication characteristics may exist with regard to each communication scheme. Therefore, in order to use a specific P2P service, a user needs to identify in advance what communication scheme is used in the corresponding service.

In addition, the P2P services using short-range communication schemes have the possibility of personal information exposure by a man-in-the-middle (MITM) attack device during authentication between users. The MITM attack device steals data between electronic devices performing authentication, and an electronic device may thus recognize the MITM attack device as an authenticated external electronic device such that the same can proceed to connect communication.

Aspects of the disclosure are to address at least the above-mentioned problems and/or disadvantages and to provide at least the advantages described below. Accordingly, an aspect of the disclosure is to provide a P2P service with an external electronic device that can be performed through multiple communication schemes, and a service handover that may be performed by considering attribute information of the external electronic device and characteristics of the service.

Another aspect of the disclosure is to provide a public key that may be exchanged with an external electronic device so as to verify a certificate, and a shared key that may be generated to perform authentication regarding the external electronic device, in order to prevent intervention by a third person such as information theft during communication in connection with P2P communication between electronic devices.

Additional aspects will be set forth in part in the description which follows and, in part, will be apparent from the description, or may be learned by practice of the presented embodiments.

In accordance with an aspect of the disclosure, an electronic device capable of heating control optimized for a user in the electronic device, and a method for controlling heating based on a user feedback in an electronic device are provided. The electronic device includes a communication module, a security module, a processor operatively connected to the communication module and the security module, and a memory operatively connected to the processor, wherein the memory stores instructions that are configured to, when executed, enable the processor to receive a public key from an external electronic device as a peer to peer (P2P) service is requested, transmit an authentication certificate chain generated based on the received public key to the external electronic device through the security module, verify an authentication certificate chain received from the external electronic device by using a root authentication certificate stored in the security module, receive encrypted information on the external electronic device from the external electronic device, decrypt the encrypted information on the external electronic device by using a shared key generated based on a result of the verifying the received authentication certificate chain, and perform the P2P service with the external electronic device through the communication module based on the decrypted information on the external electronic device.

In accordance with another aspect of the disclosure, an electronic device is provided. The electronic device includes at least one communication module, a processor operatively connected to the communication module, and a memory operatively connected to the processor, wherein the memory stores instructions that are configured to, when executed, enable the processor to identify a request for service with an external electronic device through the communication module, perform authentication for the external electronic device, control the communication module to establish a connection of a first short-range communication with the external electronic device according to a result of the authentication, receive communication information on the external electronic device through the first short-range communication, identify a second short-range communication for connecting the service with the external electronic device based on the identified communication information, and control the communication module to be connected to the external electronic device through the second short-range communication.

In accordance with another aspect of the disclosure, a method for performing a peer to peer (P2P) service in an electronic device is provided. The method includes receiving a public key from an external electronic device as a P2P service is requested, transmitting an authentication certificate chain generated based on the received public key to the external electronic device, verifying an authentication certificate chain received from the external electronic device by using a root authentication certificate stored in the security module, receiving encrypted information on the external electronic device from the external electronic device, decrypting the encrypted information on the external electronic device by using a shared key generated based on a result of the verifying the received authentication certificate chain, and performing the P2P service with the external electronic device based on the decrypted information on the external electronic device.

In accordance with another aspect of the disclosure, a method for performing a peer to peer (P2P) service in an electronic device is provided. The method includes identifying a request for service with an external electronic device, performing authentication for the external electronic device, establishing a connection of a first short-range communication with the external electronic device according to a result of the authentication, receiving communication information on the external electronic device through the first short-range communication, identifying a second short-range communication for connecting with the external electronic device based on the identified communication information, and controlling to connect the external electronic device and the service through the second short-range communication.

According to various embodiments of the disclosure, during a P2P service with an external electronic device, electronic devices may perform a service handover by considering attribute information of the external electronic device and characteristics of the service such that a communication scheme appropriate for the corresponding service can be used.

According to various embodiments of the disclosure, authentication may be performed by using a public key generated as a result of mutual authentication between an electronic device and an external electronic device, thereby preventing MITM attacks and enhancing the security of the communication connection.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
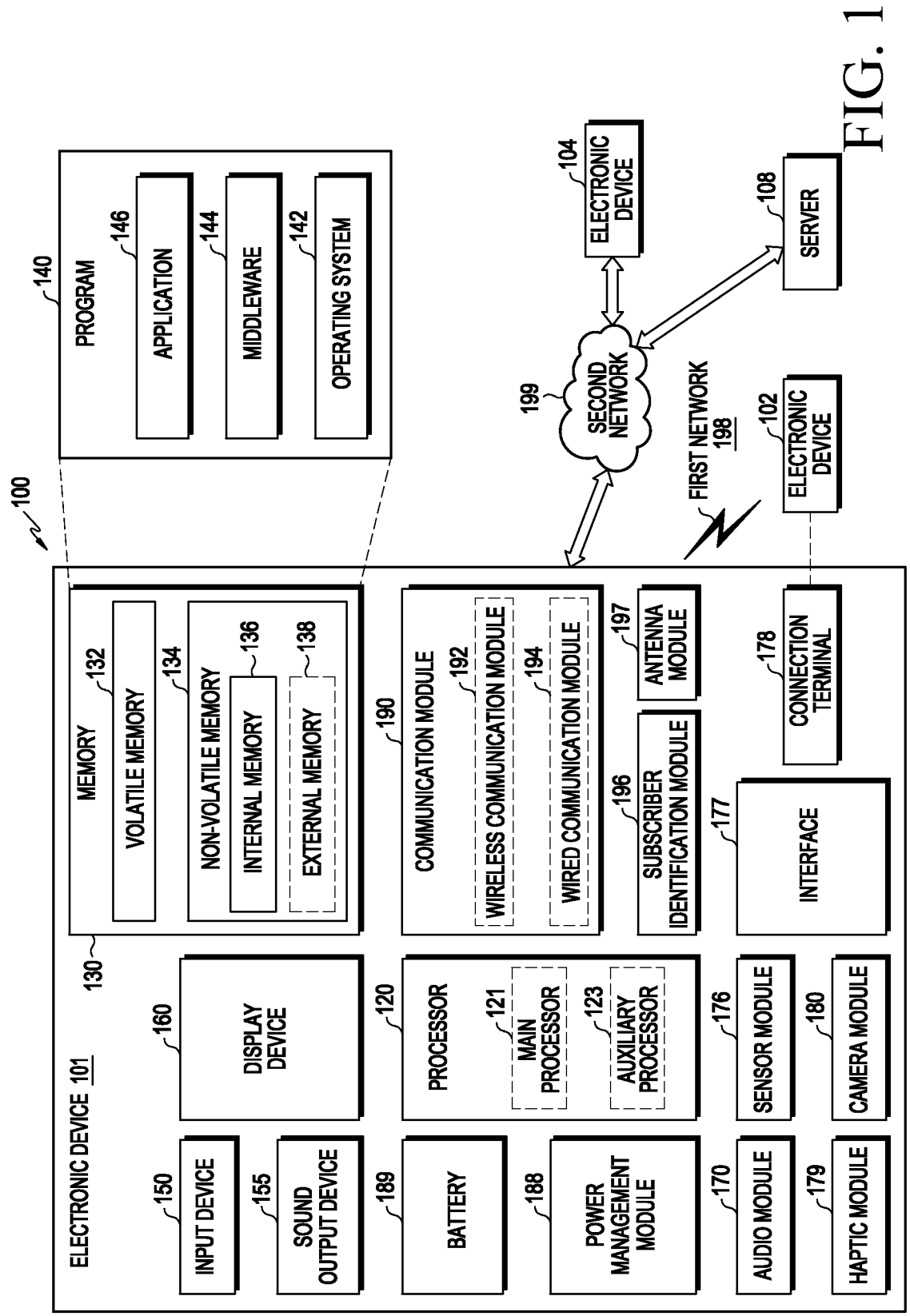
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A singular form of a noun corresponding to an item may include one or more of the items, unless the relevant context clearly indicates otherwise. As used herein, such expression as "A or B" or "at least one of A or B" may include all possible combinations of the items enumerated together. Such expressions as "a first", "a second", "the first", and "the second" may modify corresponding elements regardless of the order or the importance thereof. Theses expressions are merely used to distinguish a corresponding element from another, and do not limit the elements. When an element (e.g., first element) is referred to as being (operatively or communicatively) "connected" or "coupled" to another element (e.g., second element), it may be connected or coupled to the other element directly or via another element (e.g., a third element).

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a general-purpose processor (e.g., a central processing unit (CPU) or application processor (AP)) that may perform the corresponding operations by executing one or more software programs stored in a memory device.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. The wearable device may include at least one of an accessory type (e.g., a watch, a ring, a bracelet, an anklet, a necklace, glasses, a contact lens, or a head-mounted device (HMD)), a fabric or clothing-integrated type (e.g., electronic clothing), a body-mounted type (e.g., skin pad, or tattoo), and a bio-implantable circuit. In some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a television (TV) box (e.g., Samsung HomeSync™, Apple TV™, or Google TV™), a game console (e.g., Xbox™ and Play Station™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be flexible, or may be a combination of one or more of the aforementioned various devices. The electronic device according to various embodiments of the disclosure is not limited to the aforementioned devices. In various embodiments of the disclosure, the term "user" may refer to a person using an electronic device or a device (e.g., artificial intelligence electronic device) using an electronic device.

Hereinafter, an electronic device according to various embodiments of the disclosure, and an electronic device and method for service discovery will be described with reference to the accompanying drawings. In the disclosure, the term user may refer to a person who uses an electronic device or a device (e.g., an artificial intelligence electronic device) which uses an electronic device.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
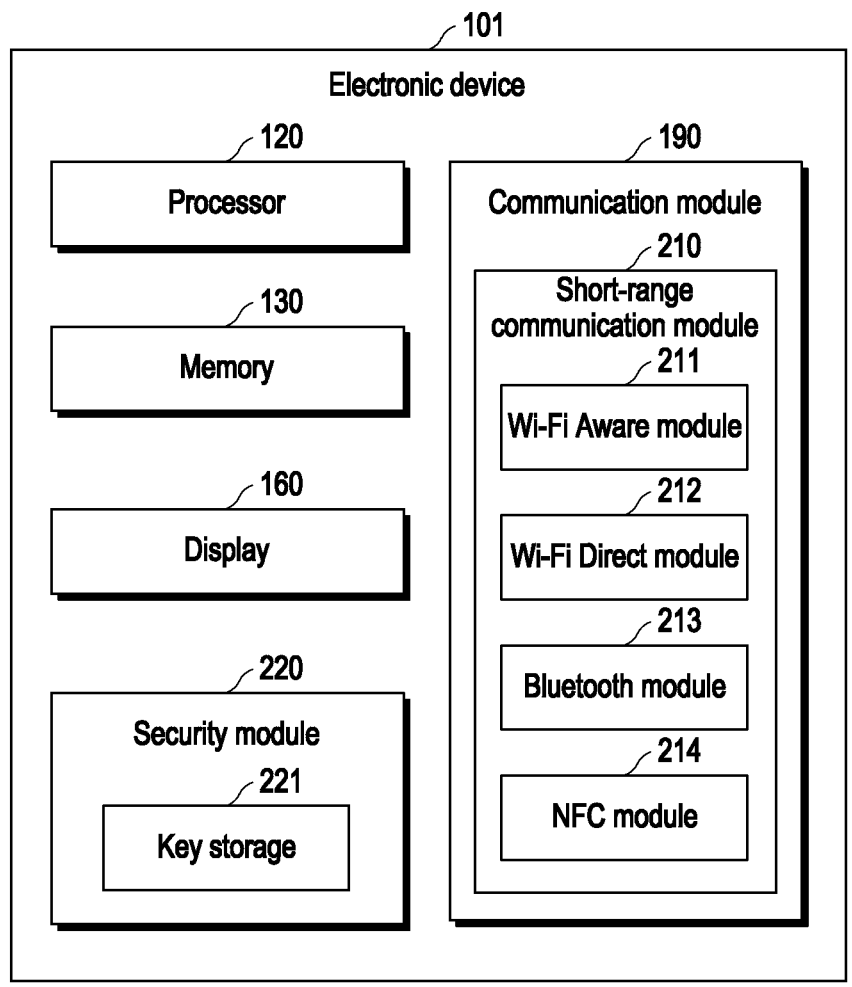
FIG. 2 is a block diagram illustrating an example of an electronic device configuration according to an embodiment of the disclosure.

FIG. 2 is a block diagram illustrating an example of an electronic device configuration according to an embodiment of the disclosure.

Referring to FIG. 2, the electronic device 101 may include a processor 120, a memory 130, a display device 160, a communication module 190, and a security module 220.

According to various embodiments of the disclosure, the processor 120 may perform overall operations related to service handover of a P2P service.

According to various embodiments of the disclosure, the processor 120 may identify a P2P service trigger according to a P2P service request by a user. For example, the P2P service may include a music sharing service or file transfer (e.g., tap-to-share or Insync) between electronic devices through short-range communication. The electronic device 101 may identify a P2P service trigger by detecting a specified gesture input (e.g., a tap gesture with the external electronic device 102) or execution of a specified application.

According to various embodiments of the disclosure, the processor 120 may measure a communication range through the short-range communication module 210. For example, the processor 120 may determine whether the service target device is located within the communicable range based on information exchanged between the electronic device 101 and the service target device (e.g., the external electronic device 102). The exchanged information may include a host device name as a host device, a host Bluetooth address, a caster device name, or a connection type with the caster device as the external electronic device 102 operates as a host device of a service handover, and may include a Bluetooth address for a communication connection with the electronic device 101.

According to various embodiments of the disclosure, an operation of measuring the communication range may be omitted based on a trigger condition of the communication scheme. For example, in the case of a specific P2P service (e.g., tap-to-share) triggered by contact between electronic devices, an operation of measuring the communication range described above may be omitted.

According to various embodiments of the disclosure, the processor 120 may receive a ranging packet of the external electronic device 102 through the short-range communication module 210 and measure a communication range based on the size or communication strength of the packet.

According to various embodiments of the disclosure, the processor 120 may determine a service handover when it is determined that the external electronic device 102 is located in the communication range. For example, a communication scheme of one of communication schemes in which a P2P service is possible may be determined, and the P2P service may be performed through the corresponding communication scheme.

According to various embodiments of the disclosure, the processor 120 may transmit information related to a service handover to an application (e.g., file transfer application, a Quick Share application, and a music share application) related to a P2P service or a module (e.g., Wi-Fi Aware module 211, Wi-Fi Direct module 212, Bluetooth module 213, or NFC module 214) related to a communication scheme.

According to various embodiments of the disclosure, the processor 120 may control the display device 160 to display a screen for notifying a user of information related to service handover. For example, the screen may include device information or service information in which a P2P service is handed over, and may include an item for selecting a permission response or a rejection response to the corresponding service.

According to various embodiments of the disclosure, when the electronic device 101 is connected to the external electronic device 102 or a peripheral device of the external electronic device 102 through a short-range communication connection, the service handover may include an operation of performing a P2P service through a supported communication scheme or a communication scheme corresponding to a specified communication condition (e.g., communication range or communication quality), or allowing at least some of the P2P services to be performed in the corresponding peripheral device. For example, the peripheral device may include a device capable of providing a P2P service by being connected to the external electronic device 102 through short-range communication.

According to various embodiments of the disclosure, the electronic device 101 may perform a service handover to a Bluetooth advanced audio distribution profile (A2DP) device of the external electronic device 102 to output contents of the electronic device 101.

According to various embodiments of the disclosure, in order to perform a P2P service with the external electronic device 102, the electronic device may perform a connection using a first communication scheme (e.g., BLE) and a P2P service using a second communication scheme (e.g., Wi-Fi Direct).

According to various embodiments of the disclosure, the electronic device 101 may perform a service handover maintaining a communication scheme previously used when connecting with the external electronic device 102 or may perform a service handover using another communication scheme based on additional information received from the external electronic device 102.

According to various embodiments of the disclosure, the electronic device 101 may include a communication module 190, a security module 220, a processor 120 operatively connected to the communication module 190 and the security module 220, and a memory 130 operatively connected to the processor 120, and the memory 130 may store instructions that, when executed, enable the processor 120 to receive a public key from an external electronic device 102 as a P2P service is requested, transmit an authentication certificate chain generated based on the received public key to the external electronic device through the security module, verify the authentication certificate chain received from the external electronic device by using a root authentication certificate stored in the security module, receive encrypted information on the external electronic device from the external electronic device, decrypt the encrypted information on the external electronic device by using a shared key generated based on the authentication certificate chain verification result, and perform the P2P service with the external electronic device through the communication module based on the decrypted information on the external electronic device.

According to various embodiments of the disclosure, the instructions may enable the processor 120 to receive the public key through a generic attribute profile (GATT) connection with the external electronic device 102 and receive encrypted information on the external electronic device 102 through the communication module 190 (or the short-range communication module 210).

According to various embodiments of the disclosure, the encrypted information on the external electronic device 102 may include at least a part of phone numbers of the external electronic device, and the instructions may enable the processor 120 to decrypt the phone number of the external electronic device 102 with the shared key, and identify the validity of the external electronic device 102 by comparing the decrypted value with the phone number of the external electronic device 102 stored in the memory 130.

According to various embodiments of the disclosure, the instructions may enable the processor 120 to generate the shared key with the same shared key as the external electronic device 102 according to the Elliptic-curve Diffie-Hellman (ECDH) rule.

According to various embodiments of the disclosure, the electronic device 101 may include at least one communication module 190, a processor 120 operatively connected to the communication module 190, and a memory 130 operatively connected to the processor 120, and the memory 130 may store instructions that, when executed, enable the processor 120 to identify a service request with an external electronic device through the communication module 190, perform authentication for the external electronic device, control the communication module to establish a connection of a first short-range communication with the external electronic device according to the result of the authentication, receive communication information on the external electronic device through the first short-range communication, identify a second short-range communication for connecting the service with the external electronic device based on the identified communication information, and control the communication module 190 (or the short-range communication module 210) to be connected to the external electronic device through the second short-range communication.

According to various embodiments of the disclosure, the electronic device 101 may further include a security module 220, and the instructions may enable the processor 120 to transmit a public key to the external electronic device, receive an authentication certificate chain generated based on the transmitted public key from the external electronic device, verify the authentication certificate chain received from the external electronic device by using a root authentication certificate stored in the security module, control the security module 220 to identify a shared key commonly used with the external electronic device 102 based on a result of verifying the authentication certificate chain, decrypt the communication information based on the shared key, and identify information of a previous communication connection with the external electronic device 102 based on the decrypted communication information.

According to various embodiments of the disclosure, the instructions may enable the processor 120 to identify a randomly generated nonce value and a timestamp for the nonce value, and control the security module 220 to encrypt the nonce value with the shared key.

According to various embodiments of the disclosure, the instructions may enable the processor 120 to control the communication module 190 (or the short-range communication module 210) to transmit the encrypted nonce value to the external electronic device 102, identify whether the decrypted communication information and the identified nonce value correspond based on the identified timestamp value, and identify that short-range communication has been previously performed with the external electronic device 102 as it is determined that the decrypted communication information and the identified nonce value correspond.

According to various embodiments of the disclosure, the instructions may enable the processor 120 to release the connection of the first short-range communication and establish the connection of the second short-range communication.

According to various embodiments of the disclosure, the instructions may enable the processor 120 to identify service handover information according to identifying the connection of the second short-range communication with the external electronic device 102, and control the communication module 190 (or the short-range communication module 210) to transmit the service handover information to the P2P service and application. For example, the service handover information may include at least one of configuration information related to a communication scheme through which the P2P service is performed, identification information on at least one peripheral device, and communication information on the at least one peripheral device.

According to various embodiments of the disclosure, the display device 160 may display notification information related to the service handover. For example, a list of devices of the external electronic device 102 found according to the electronic device discovery may be displayed and the user may select a device in which service the handover is performed.

According to various embodiments of the disclosure, the communication module 190 (or the short-range communication module 210) may perform P2P communication with the external electronic device 104 or the external electronic device 102. For example, the short-range communication module 210 may include at least one of a Wi-Fi Aware module 211, a Wi-Fi Direct module 212, a Bluetooth module 213, and an NFC module 214, and may include various other configurations for short-range communication.

According to various embodiments of the disclosure, the communication module 190 may include the short-range communication module 210. For example, the short-range communication module 210 may identify the communication scheme determined based on service handover-related information to control at least one of the Wi-Fi Aware module 211, the Wi-Fi Direct module 212, the Bluetooth module 213 and the NFC module 214 to perform P2P communication.

According to various embodiments of the disclosure, the electronic device 101 may transmit and receive advertising data for a P2P service. For example, the advertising data may include a TDS service universally unique identifier (UUID), a TDS advertising type (AD type), and a transport block based on a transport discovery service (TDS) protocol defined in the Bluetooth SIG.

According to various embodiments of the disclosure, the electronic device 101 (or the external electronic device 102) may request activation of a service using the corresponding communication scheme by including specific communication scheme and related configuration information desired to be connected to an external electronic device in the 'transport data' field of the TDS-based advertising data.

Table 1 relates to advertising data based on the TDS protocol.

TABLE 1

| 1 | 2 | 3 | 4 | 5 | 6 | 7 | 8 | 9 | 10 | 11 | 12 |
|---|---|---|---|---|---|---|---|---|---|---|---|
| Length | Flags AD Type | Flags data | Length | Service UUID AD type | Service UUID | | Length | Transport discovery data AD type | Organization ID | TDS flags | Transport data length |
| 0 x 02 | 0 x 01 | 0 x 1A | 0 x 03 | 0 x 03 | 0 x 24 | 0 x 18 | 0 x 04 | 0 x 26 | 0 x 01 | 0 x 02 | 0 x 08 |

| 13 | 14 | 15 | 16 | 17 | 18 | 19 | 20 | 21 | 22 | 23 | 24 |
|---|---|---|---|---|---|---|---|---|---|---|---|
| | | | | | | Transport data | | | | | |
| Length | P2P Service ID | Service data | | Length | Tx Power Com. | Service data | | Length | Device ID | Service data | |
| 0 x 03 | 0 x 10 | 0 x 00 | 0 x 03 | 0 x 03 | 0 x 14 | 0 x AE | 0 x FC | 0 x 04 | 0 x 15 | 0 x AE | 0 x 3C |

| 25 | 26 | 27 | 28 | 29 | 30 | 31 |
|---|---|---|---|---|---|---|
| | | | Transport data | | | |
| Service data | | | | | | |
| 0 x B3 | | | | | | |

According to various embodiments of the disclosure, the electronic device 101 supporting a music share service or a tap-to-share service may include the TDS UUID and the TDS AD data type in advertising data as a basis, and may configure by including information such as a service identifier of the music share service or the tap-to-share service in the service data of the 'transport data' field. Table 2 relates to a structure of advertising data in which the 'transport data' field is configured according to various embodiments of the disclosure.

TABLE 2

| 1<br>Length | 2<br>Flags<br>AD<br>Type | 3<br>Flags<br>data | 4<br>Length | 5<br>Service<br>UUID<br>AD<br>type | 6<br>Service UUID | 7 | 8<br>Length | 9<br>Transport<br>discovery<br>data AD<br>type | 10<br>Organization<br>ID | 11<br>TDS<br>flags | 12<br>Transport<br>data<br>length |
|---|---|---|---|---|---|---|---|---|---|---|---|
| 0 × 02 | 0 × 01 | 0 × 1A | 0 × 03 | 0 × 03 | 0 × 24 | 0 × 18 | 0 × 04 | 0 × 26 | 0 × 01 | 0 × 02 | 0 × 0C |
| 13 | 14 | 15 | 16 | 17 | 18 | 19 | 20 | 21 | 22 | 23 | 24 |
| | | | | | | Transport data | | | | | |
| Length | P2P<br>Service<br>ID | Service data | Length | Signature | | | | Service data | | | |
| 0 × 03 | 0 × 10 | 0 × 00 | 0 × 01 | 0 × 07 | 0 × 12 | 0 × EF | 0 × 83 | 0 × FC | 0 × 17 | 0 × 3A | 0 × C2 |

According to various embodiments of the disclosure, the advertising data may include information configured or requested by a P2P service or a specific application. For example, the 'P2P service ID' field of the advertising data may include identification information on the requested P2P service, the 'Tx power compensation' field of the advertising data may include the BLE transmission power compensation value to identify proximity, and the 'device ID' field may include electronic device identification information or the 'signature' field may include a shared nonce value for a specific electronic device. In addition, the advertising data may include information such as configuration information on an advertising period for discovering the BLE device, identification information on the device connected to the BLE, or additional data. Table 3 relates to information on the 'type' field included in the advertising data according to various embodiments of the disclosure.

TABLE 3

| Type | Name | Definition | Format |
|---|---|---|---|
| 0x10 | P2P<br>service ID | Type for P2P service | 2 bytes0x01: instance<br>session0x01: Insync<br>0x04: ShareLive |
| 0x11 | Notification | For head-up-notification.<br>Alerting the advertise-<br>ment is only for HUN | 2 bytes0x01: instance<br>session0x01: Insync<br>0x04: ShareLive |
| 0x12 | signature | Pre-shared nonce value<br>for a specific device | 6 (or 10) bytes of hash<br>value for nonce |
| 0x13 | Vendor<br>specific data | Variable length of data | |
| 0x14 | Tx power<br>compensation | Path loss compensation<br>value (TRP/TIS) | 2 bytes |
| 0x15 | Device ID | Unique identifier for<br>cast devices | 3 bytes |
| . . . | . . . | . . . | . . . |

According to various embodiments of the disclosure, the short-range communication module 210 may establish a generic attribute profile (GATT) connection with the external electronic device 102. For example, the electronic device 101 may establish a GATT connection with the external electronic device 102 in response to the advertising data from the external electronic device 102. According to various embodiments of the disclosure, the operation of establishing a GATT connection may include an operation of the electronic device 101 performing service discovery for a GATT service provided by the external electronic device 102. For example, the operation of establishing a GATT connection may include an operation of negotiating a maximum transmission unit (MTU) size to identify the size of data transmitted and received after the GATT connection is established. Table 4 relates to various examples of TDS characteristics configured in data communicated in a GATT connection according to various embodiments of the disclosure.

TABLE 4

| Characteristic<br>name | Requirement | Mandatory<br>properties | Optional<br>properties | Security<br>Permissions |
|---|---|---|---|---|
| TDS control<br>point | O | Write,<br>indicate | Write | none |
| Key exchange | M | Write | Reliable<br>write | |

According to various embodiments of the disclosure, the electronic device 101 may designate the TDS as the primary service of the GATT connection, and may additionally configure a separate characteristic such as a key exchange with a TDS control point, which is a characteristic of TDS, and may be applied during data exchange. According to various embodiments of the disclosure, the electronic device 101 may configure the 'key exchange' characteristic of the TDS characteristic to notify the external electronic device 102 of transmission of data including the public key. According to various embodiments of the disclosure, in the "transport discovery service" field of data in the GATT connection, various setting values for a corresponding characteristic may be set. For example, a value indicating that it is essential (M) or optional (O) for a requirement for a specific characteristic may be included. For mandatory properties or optional properties, write or indicate property related to the corresponding property may be included. In addition, a value indicating whether to include security permissions may be set.

According to various embodiments of the disclosure, the short-range communication module 210 may attempt BLE (or LE) pairing with the external electronic device 102. For example, the BLE pairing may be selectively performed separately from authentication.

According to various embodiments of the disclosure, the communication module 190 (or the short-range communication module 210) may release the GATT connection with the service target device. For example, as the discovery, authentication, or exchange of communication information between the electronic device 101 and the external electronic device 102 is completed, the GATT connection may be released.

According to various embodiments of the disclosure, in a case where the GATT reconnection for service conversion is required after the GATT connection is released, the electronic device 101 may set data of the GATT connection including a hash value for a nonce exchanged with the external electronic device 102. For example, the nonce is encrypted with a public key generated through the security module 220 and exchanged with the external electronic device 102, and may be used as a mutual identifier.

According to various embodiments of the disclosure, in a case where the electronic device 101 and the external electronic device 102 want to reconnect while the GATT connection is released, the security module 220 may decrypt the nonce included in data advertised from the external electronic device 102, and may authenticate the external electronic device 102 as a previously connected user according to whether the decrypted nonce corresponds to the nonce transmitted from the electronic device 101 to the external electronic device 102. For example, the electronic device 101 and the external electronic device 102 may store the nonce together with a timestamp when generating a nonce to identify whether the received nonce is a nonce transmitted from the electronic device.

Figure 3:
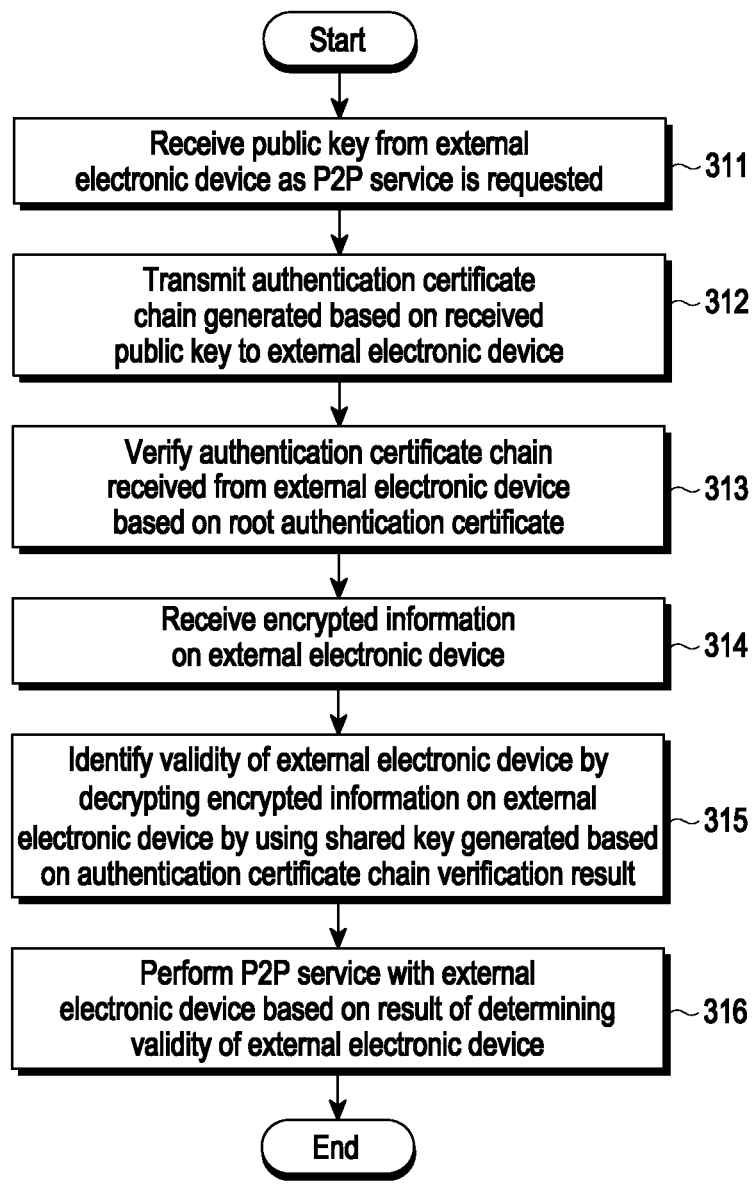
FIG. 3 is a flowchart illustrating an example of an operation of performing authentication for a P2P service in an electronic device according to an embodiment of the disclosure.

FIG. 3 is a flowchart illustrating an example of an operation of performing authentication for a P2P service in an electronic device according to an embodiment of the disclosure.

Referring to FIG. 3, according to an embodiment, in operation 311, the electronic device 101 may receive a public key from the external electronic device 102 as a P2P service is requested. For example, the electronic device 101 may receive the public key through a GATT connection with the external electronic device 102 and receive encrypted information on the external electronic device 102. The GATT connection may be established through the communication module 190 of the electronic device 101.

According to various embodiments of the disclosure, the encrypted information on the external electronic device 102 may include at least a part of a phone number, and the electronic device 101 may decrypt the phone number of the external electronic device 102 with a shared key and compare the decrypted value with the phone number of the external electronic device 102 stored in the memory 130 to identify the validity of the external electronic device 102.

According to various embodiments of the disclosure, according to the Elliptic-curve Diffie-Hellman (ECDH) rule, the shared key may be generated identically to the shared key in the external electronic device 102.

In operation 312, the electronic device 101 may transmit an authentication certificate chain generated based on the received public key to the external electronic device 102.

In operation 313, the electronic device 101 may verify the authentication certificate chain received from the external electronic device 102 based on the root authentication certificate of the security module 220.

In operation 314, the electronic device 101 may receive encrypted information on the external electronic device 102 from the external electronic device 102. For example, the external electronic device 102 may transmit the encrypted information on the external electronic device 102 to the electronic device 101 based on a verification result of the authentication certificate chain in the external electronic device 102.

In operation 315, the electronic device 101 may control the security module 220 to identify the validity of the external electronic device 102 by decrypting the encrypted information on the external electronic device 102 by using the shared key generated based on the authentication certificate chain verification result.

According to various embodiments of the disclosure, when the electronic device 101 transmits a public key generated in the electronic device 101 to the external electronic device 102, the electronic device 101 may receive an authentication certificate chain issued for the transmitted public key from the external electronic device 102. For example, the electronic device 101 may verify the received authentication certificate chain with the root authentication certificate of the security module 220 to verify the external electronic device 102.

According to various embodiments of the disclosure, when the validity of the external electronic device 102 is determined according to the verification result of the authentication certificate chain, the electronic device 101 may generate a shared key.

In operation 316, the electronic device 101 may perform the P2P service with the external electronic device 102 based on the result of determining the validity of the external electronic device 102. For example, the electronic device 101 may perform the P2P service with the external electronic device 102 through the communication module 190 (or the short-range communication module 210).

Figure 4:
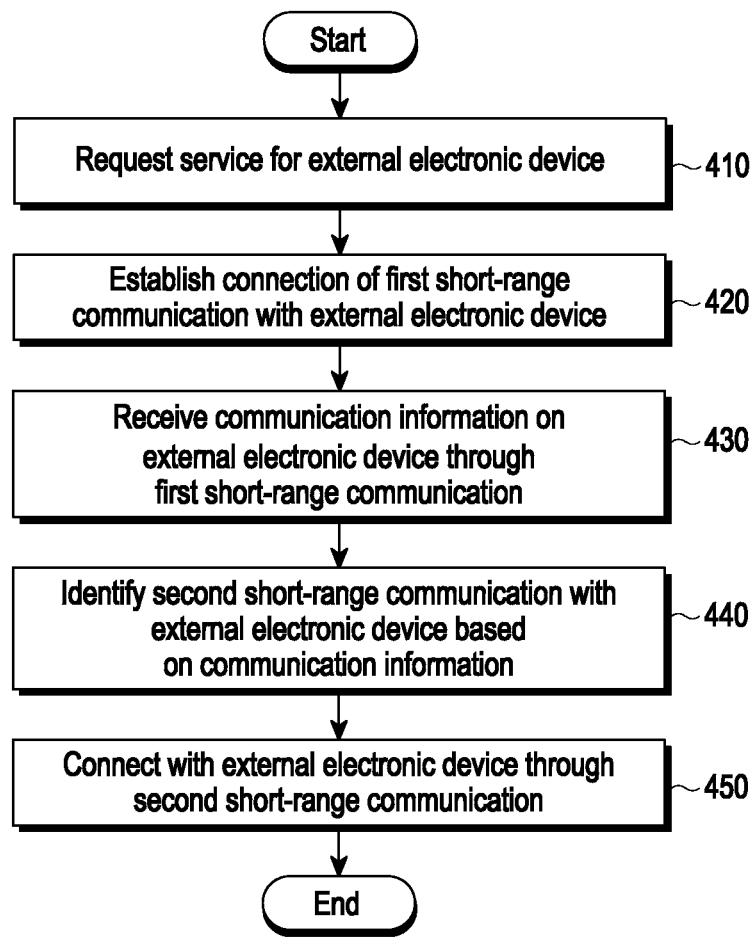
FIG. 4 is a flowchart illustrating an example of an operation in which an electronic device performs a P2P service with an external electronic device according to an embodiment of the disclosure.

FIG. 4 is a flowchart illustrating an example of an operation in which an electronic device performs a P2P service with an external electronic device according to an embodiment of the disclosure.

Referring to FIG. 4, in operation 410, the electronic device 101 may identify a service request for the external electronic device 102.

In operation 420, the electronic device 101 may establish a connection (e.g., a GATT connection or a BLE connection) of the first short-range communication with the external electronic device 102 through the communication module 190 (or the short-range communication module 210).

According to various embodiments of the disclosure, the electronic device 101 may perform authentication for the external electronic device 102 by identifying a service request for the external electronic device 102. For example, the electronic device 101 may transmit a public key to the external electronic device 102 and receive an authentication certificate chain generated based on the transmitted public key from the external electronic device 102.

According to various embodiments of the disclosure, the electronic device 101 verify the authentication certificate chain received from the external electronic device 102 by using the root authentication certificate stored in the security module 220, and authenticate the external electronic device 102 according to the verification result of the authentication certificate chain.

In operation 430, the electronic device 101 may receive communication information for connection with the external electronic device 102 through the first short-range communication. For example, the electronic device 101 may perform a service handover with the external electronic device 102 based on the communication information.

In operation 440, the electronic device 101 may identify second short-range communication (e.g., Wi-Fi Direct, Wi-Fi Aware, or Bluetooth) for connection with the external electronic device 102 based on the identified communication information. For example, the electronic device 101 may transmit service handover-related information including information related to the second short-range communication to the external electronic device 102.

In operation 450, the electronic device 101 may control to be connected to the external electronic device 102 through the second short-range communication. For example, the connection of the second short-range communication may be established after the connection of the first short-range communication is released.

According to various embodiments of the disclosure, the electronic device 101 may control the security module 220 to decrypt the communication information based on the public key, and may identify information on a previous communication connection with the external electronic device based on the decoded communication information.

According to various embodiments of the disclosure, the electronic device 101 may identify a nonce value randomly generated and a timestamp for the nonce value, encrypt the nonce value with the public key, and may identify whether the decrypted communication information and the identified nonce value correspond to each other based on the value of the above identified timestamp. As it is determined that the decrypted communication information and the identified nonce value correspond to each other, it may be confirmed that the electronic device 101 has previously performed short-range communication with the external electronic device.

According to various embodiments of the disclosure, the electronic device 101 may disconnect the first short-range communication and establish a connection of the second short-range communication.

According to various embodiments of the disclosure, the electronic device 101 may identify service handover information according to confirming connection of the second short-range communication with the external electronic device 102 and transmit the service handover information to a server or an application related to the P2P service. The service handover information may include at least one of configuration information related to a communication scheme in which the P2P service is performed, identification information on the at least one peripheral device, and communication information on the at least one peripheral device.

Figure 5:
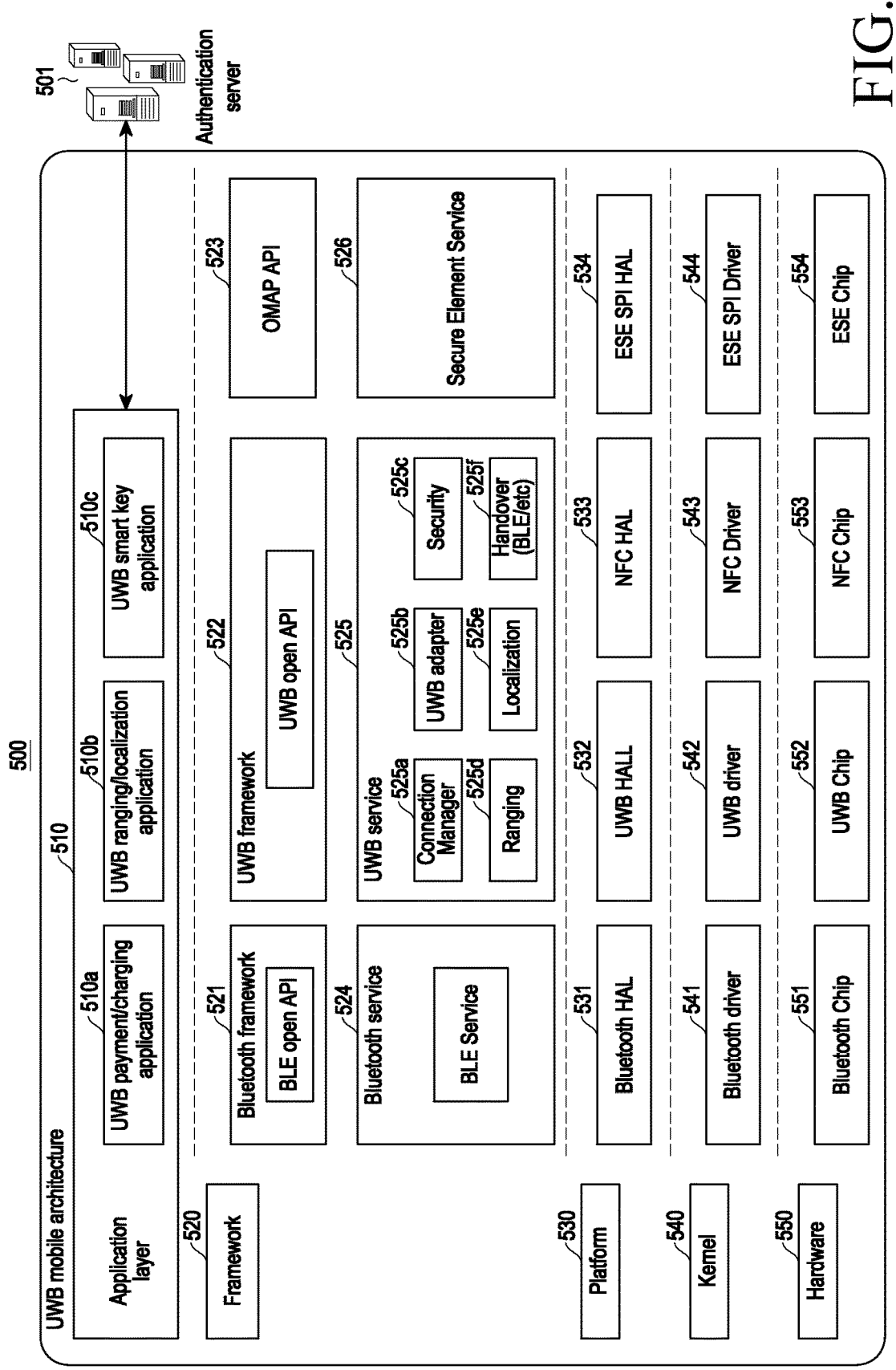
FIG. 5 is a block diagram illustrating an example of a software configuration according to an embodiment of the disclosure.

FIG. 5 is a block diagram illustrating an example of a software configuration according to an embodiment of the disclosure.

According to various embodiments of the disclosure, the electronic device 101 or the external electronic device 102 performing the P2P service may operate based on the ultra-wide-band (UWB) mobile architecture 500.

Referring to FIG. 5, the UWB mobile architecture 500 may include an application layer 510, a framework 520, a platform 530, a kernel 540, and a hardware 550.

According to various embodiments of the disclosure, the application layer 510 may include a UWB payment/charging application 510a, UWB ranging/localization application 510b or a UWB smart key application 510c. The UWB smart key application may transmit and receive authentication information to and from the authentication server 501.

According to various embodiments of the disclosure, the application UWB ranging/localization application may provide a service for discovering the external electronic device 102 in the electronic device 101 and determining whether the external electronic device 102 is located in a communication range. For example, the UWB smart key application may manage a key (e.g., a shared key or a public key received from the external electronic device 102) related to authentication between the electronic device 101 and the external electronic device 102 through UWB communication.

According to various embodiments of the disclosure, the application framework 520 may include a Bluetooth framework 521 including a BLE open application programming interface (API), a UWB framework 522 including a UWB open API, an open multimedia applications platform (OMAP) API 523, a Bluetooth service 524 including a BLE service, a UWB service 525, or a security element service 526 including a security element service.

According to various embodiments of the disclosure, the UWB service 525 provided in the UWB mobile architecture 500 may include services such as a connection manager 525a, a UWB adapter 525b, security 525c, ranging 525d, localization 525e, handover (e.g., BLE) 525f, etc.

According to various embodiments of the disclosure, the electronic device 101 may establish a UWB connection with the external electronic device 102 through the connection manager 525a.

According to various embodiments of the disclosure, the electronic device 101 may transmit and receive a ranging packet for discovering the external electronic device 102 through the ranging 525d service of the UWB service 525. For example, the electronic device 101 may determine whether the external electronic device 102 is located in a communication range through a localization 525e service.

According to various embodiments of the disclosure, the electronic device 101 may perform a service handover to the external electronic device 102 by using the handover 525f service. For example, the service handover may include an operation of determining a communication scheme related to the external electronic device 102 and performing a P2P service with the external electronic device 102 in the determined communication scheme.

According to various embodiments of the disclosure, the platform 530 may include a Bluetooth hardware abstraction layer (HAL) 531, a UWB HAL 532, an NFC HAL 533, or an ESE SPI HAL 534.

The kernel 540 may include a Bluetooth driver 541, a UWB driver 542, an NFC driver 543, or an ESE SPI driver 544.

The hardware 550 may include a Bluetooth chip 551, a UWB chip 552, an NFC chip 553, or an ESE chip 554.

Figure 6:
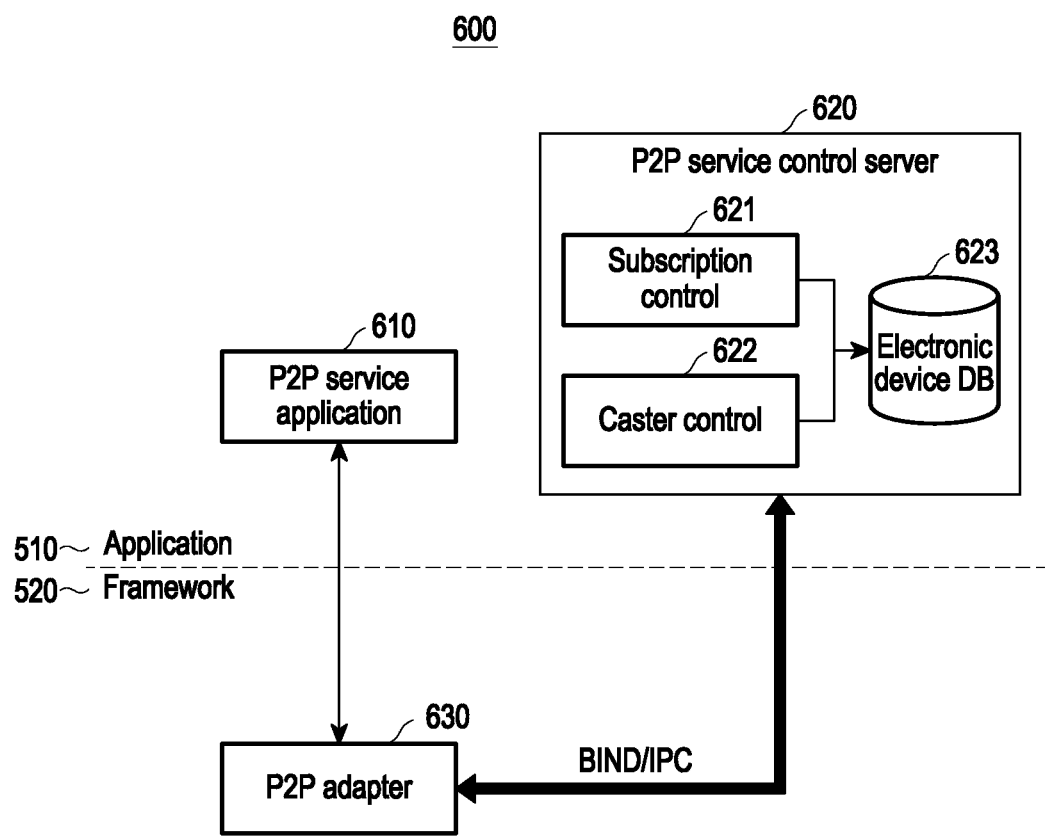
FIG. 6 is a diagram illustrating an example of a software structure according to an embodiment of the disclosure.

FIG. 6 is a diagram illustrating an example of a software structure according to an embodiment of the disclosure.

Referring to FIG. 6, a mobile architecture 600 may include the application layer 510 and the framework 520.

According to various embodiments of the disclosure, the application layer 510 may include a P2P service application 610 and a P2P service control server 620.

According to various embodiments of the disclosure, the P2P service application 610 may include an application that provides various services through a P2P connection, such as a gallery application that transfers photos with a tap-to-share function, a music sharing application, a quick share application for fast file transfer, or a tab tracking-based file transfer (e.g., InSync function) application for file sharing.

According to various embodiments of the disclosure, the P2P service control server 620 may be for performing search and connection or authentication between devices to support heterogeneous communication schemes, and may include a subscription control 621 server for controlling a subscription device requesting authentication, a caster control 622 server for controlling a caster device to be authenticated, or an electronic device DB 623.

According to various embodiments of the disclosure, the subscription control 621 server and the caster control 622 server may control the P2P devices (e.g., the electronic device 101 or the external electronic device 102) to serve as a subscription (or client) or caster in the application layer 510.

According to various embodiments of the disclosure, the electronic device DB 623 may include information on electronic devices related to the P2P service, such as a communication scheme of the electronic device performing the P2P service, service information, or connected peripheral device (or caster device) information.

According to various embodiments of the disclosure, the electronic device DB 623 may include device information, communication information, or authentication information for the host device and the guest device of the service handover. For example, the information on the host device may include a name of the host device, a Bluetooth address, information on the caster device, or information on connection with the caster device. The information on the guest device may include a name of the guest device or Bluetooth information.

According to various embodiments of the disclosure, the framework 520 may include a P2P adapter 630. For example, the P2P adapter 630 may be configured by a software development kit (SDK), and may communicate (e.g., inter-process communication) information related to a P2P device between the P2P service control server 620 in the framework 520.

According to various embodiments of the disclosure, the P2P service request from the electronic device 101 may be transmitted to the P2P service application 610. For example, the P2P service control server 620 may control the electronic device 101 to operate as a subscription or caster device based on information stored in the electronic device DB 623 through the application layer 510.

According to various embodiments of the disclosure, the P2P adapter 630 may operate in the form of a demon program in the electronic device 101 by being distinguished from operations of the P2P service application 610 and the P2P service control server 620 in the framework 520. For example, the P2P service control server 620 may bind and use the P2P adapter 630 for the P2P service.

Figure 7:
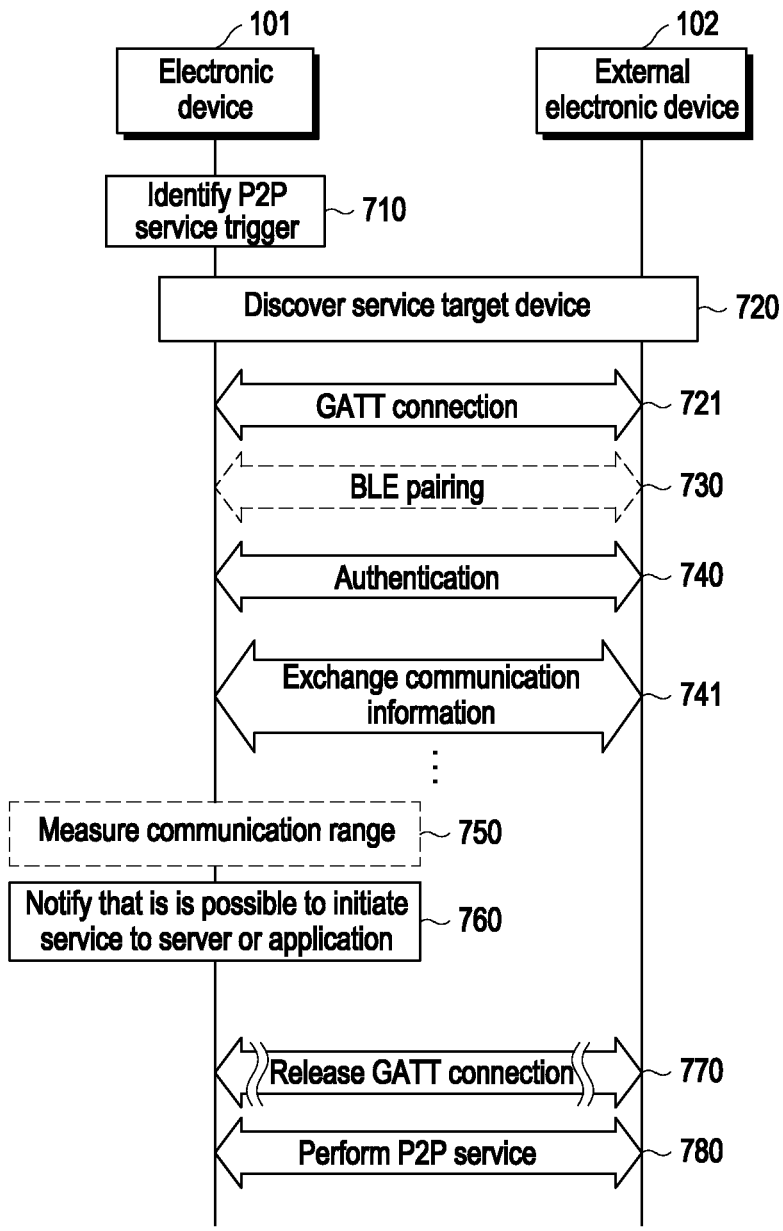
FIG. 7 is a flowchart illustrating an example of an operation of performing a P2P service in an electronic device according to an embodiment of the disclosure.

FIG. 7 is a flowchart illustrating an example of an operation of performing a P2P service in an electronic device according to an embodiment of the disclosure.

Referring to FIG. 7, in operation 710, the electronic device 101 may identify a P2P service trigger according to a P2P service request from a user. For example, the P2P service may include a music sharing service or file transfer between electronic devices through short-range communication.

According to various embodiments of the disclosure, the electronic device 101 may identify a P2P service trigger according to detecting a specified gesture input (e.g., a tap gesture with the external electronic device 102) or execution of a specified application.

In operation 720, the electronic device 101 may discover a service target device for the P2P service.

According to various embodiments of the disclosure, the electronic device 101 may generate advertising data including information configured in a corresponding P2P service or an application in which the corresponding P2P service is performed, and transmit the same to the external electronic device 102. For example, the information set in the application may include information (e.g., an application name or an application ID) capable of distinguishing the executed application and a type of P2P service (e.g., file transfer) that may be performed in the application. In an embodiment, the electronic device 101 may identify the external electronic device 102 as a service target device by receiving a response to the advertising data from at least one external electronic device (e.g., the external electronic device 102).

In operation 721, the electronic device 101 and the external electronic device 102 may establish a GATT connection. For example, the electronic device 101 may establish the GATT connection with the external electronic device 102 as a short-range communication (e.g., BLE) connection request is included in the response to the advertising data.

According to various embodiments of the disclosure, the GATT connection may be established and released through BLE communication for BLE service discovery.

In operation 730, the electronic device 101 and the external electronic device 102 may perform BLE pairing through the GATT connection. For example, in a case where the electronic device 101 and the external electronic device 102 have authenticated each other by exchanging phone number information in a previous connection, the above-described BLE pairing operation may be omitted.

In operation 740, the electronic device 101 and the external electronic device 102 may perform authentication. For example, the electronic device 101 and the external electronic device 102 may encrypt the phone number based on the public key. The electronic device 101 and the external electronic device 102 may exchange the encrypted phone number based on the BLE connection, and may decrypt the phone number with the public key to perform authentication on the counterpart device.

According to various embodiments of the disclosure, the phone number may be encrypted based on the public key generated by performing the public key generation operation in the security module 220 of FIG. 2.

In operation 741, the electronic device 101 and the external electronic device 102 may exchange communication information. For example, the information is short-range communication information available in relation to the P2P service requested by the electronic device 101 or the external electronic device 102, and may include a hashed phone number, CRC, user information of an electronic device, a Bluetooth address, a communication scheme type (e.g., Wi-Fi Aware or Wi-Fi Direct), or additional information on an application or P2P service.

According to various embodiments of the disclosure, the additional information on the application or P2P service is information required by a specific application or P2P service, may include peripheral device information (e.g., Bluetooth address or name of the peripheral device) of the external electronic device 102 for the music sharing application, and account information related to the application may be exchanged for the music streaming application.

According to various embodiments of the disclosure, the electronic device 101 may determine the communication scheme through which the P2P service may be handed over by identifying the communication information. For example, the communication information may include information on a communication scheme (e.g., Wi-Fi Direct or UWB) in which data transmission is possible in the external electronic device 102.

According to various embodiments of the disclosure, the electronic device 101 and the external electronic device 102 may determine the communication scheme for performing the P2P service based on the communication information.

In operation 750, the electronic device 101 and the external electronic device 102 may measure a communication range (or a distance between the electronic device 101 and the external electronic device 102). For example, the electronic device 101 and the external electronic device 102 may determine whether the electronic device 101 and the external electronic device 102 are located in a range that may communicate with each other based on the exchanged information (e.g., a received signal strength indicator (RSSI) of a BLE packet). For example, the electronic device 101 may average the RSSI values of the BLE packet, predict the distance from the external electronic device 102 based on the average value, and identify a range corresponding to the predicted distance as the communication range. The operation of measuring the communication range may be omitted based on the trigger condition of the communication scheme.

According to various embodiments of the disclosure, the electronic device 101 may identify the communication scheme (e.g., UWB) for measuring a communication range, and measure a communication range of the external electronic device 102 based on information exchanged through the identified communication scheme. For example, the electronic device 101 may identify the communication scheme having a communication quality of a specified condition within the measured communication range among communication schemes that may be performed with the external electronic device 102.

According to various embodiments of the disclosure, the electronic device 101 may measure a distance to at least one external electronic device 102 through UWB communication, and may identify a communication scheme or a communication order based on the measured distance. For example, the electronic device 101 may identify a priority communication scheme based on the communication order, and determine the identified communication scheme as a communication scheme for P2P service with the external electronic device 102.

According to various embodiments of the disclosure, the electronic device 101 may perform a service handover to the identified communication scheme so that the P2P service is performed through the identified communication scheme.

According to various embodiments of the disclosure, in the case of a specific P2P service (e.g., tap-to-share) triggered by a contact between electronic devices 101, the external electronic device 102 may omit the operation of measuring the communication range described above.

In operation 760, in response to the P2P service trigger, the electronic device 101 may notify that it is possible to initiate a P2P service with the external electronic device 102 within a range that may be communicated with a server and an application related to the corresponding P2P service. For example, the electronic device 101 may identify a communication scheme or a caster device in which a P2P service is performed based on the exchanged communication information.

According to various embodiments of the disclosure, the electronic device 101 may notify the server associated with the service that the service handover is performed according to the characteristics of the P2P service.

In operation 770, the electronic device 101 and the external electronic device 102 may release the GATT connection. For example, in a case where the BLE pairing operation is performed thereafter, the electronic device 101 and the external electronic device 102 may re-establish the GATT connection.

According to various embodiments of the disclosure, although the GATT connection is described as being established for service handover, various other short-range communication schemes (e.g., Wi-Fi Aware) may be possible. For example, the electronic device 101 may release the GATT connection to reduce power consumption caused by maintaining the GATT connection.

In operation 780, the electronic device 101 and the external electronic device 102 may perform a P2P service. For example, in a case where the P2P service is a music sharing service, the electronic device 101 may perform the P2P service with the external electronic device 102 (or a caster device) by using a communication scheme determined based on communication information through the music sharing service or a related application.

According to various embodiments of the disclosure, in a case where communication with the external electronic device 102 is not possible through the determined communication scheme, the electronic device 101 may control to perform the P2P service by using a predetermined basic communication scheme (e.g., Bluetooth or BLE).

Figure 8:
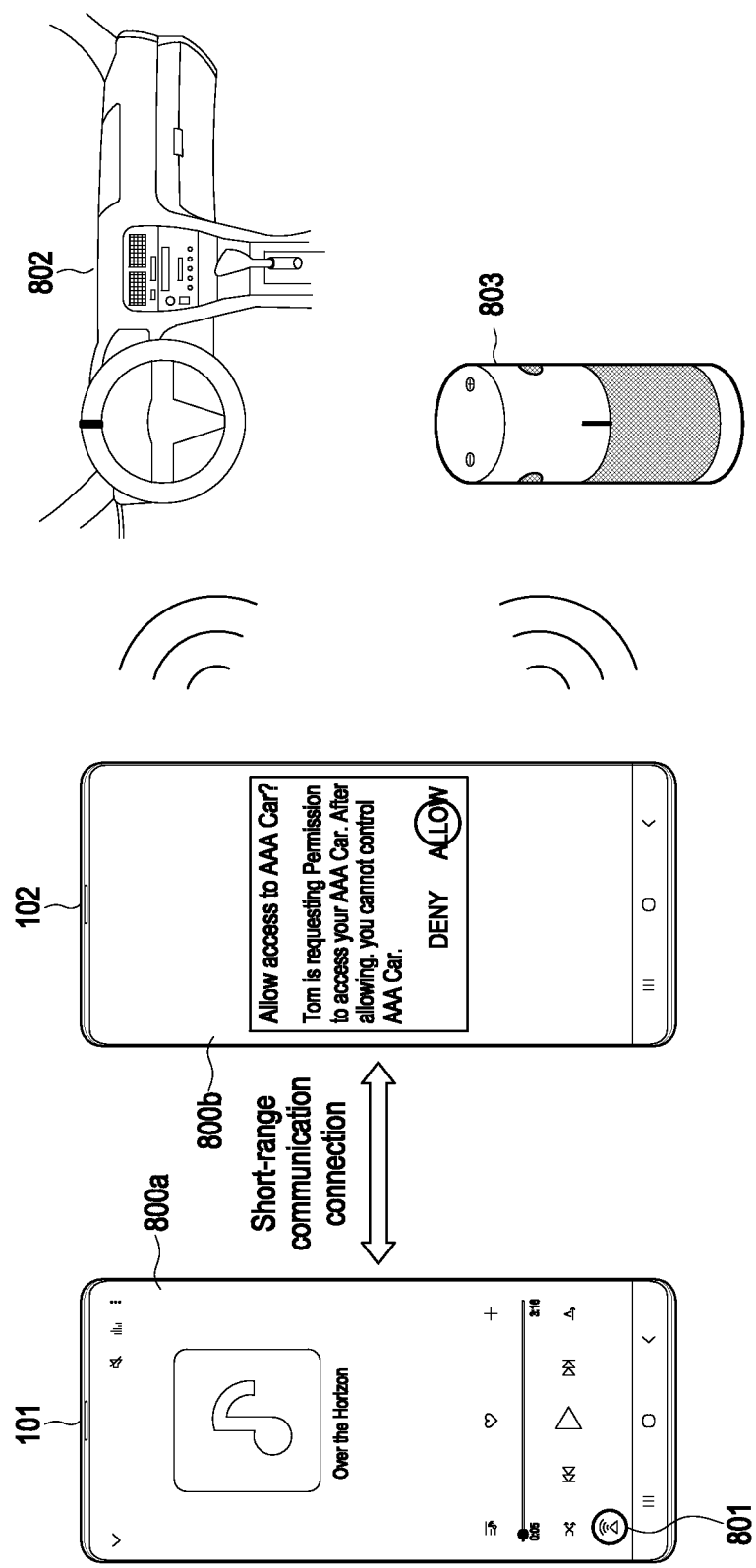
FIG. 8 is a diagram illustrating an example of an operation of performing a P2P service in an electronic device according to an embodiment of the disclosure.

FIG. 8 is a diagram illustrating an example of an operation of performing a P2P service in an electronic device according to an embodiment of the disclosure.

Referring to FIG. 8, the electronic device 101 may identify that a user executes a music sharing application or requests a music sharing service through P2P. For example, as the user selects a specified button 801 on the screen 800a of the music playback application, the electronic device 101 may identify the request for the music sharing service.

According to various embodiments of the disclosure, the electronic device 101 may identify the external electronic device 102 as a service target device according to the service request. For example, the electronic device 101 may establish a short-range communication connection (e.g., GATT connection) with the external electronic device 102 through the communication module 190.

According to various embodiments of the disclosure, the electronic device 101 may perform authentication for the external electronic device 102. For example, the electronic device 101 and the external electronic device 102 may generate and exchange a public key, and transmit the issued authentication certificate chain by using the public key received to the counterpart device.

According to various embodiments of the disclosure, the electronic device 101 and the external electronic device 102 may verify the received authentication certificate chain by using the stored root authentication certificate. For example, mutual authentication may be completed according to the verification result of the authentication certificate chain.

According to various embodiments of the disclosure, as the authentication is completed, the electronic device 101 may receive communication information from the external electronic device 102. For example, the communication information may include communication scheme information connectable by the external electronic device 102, information on a peripheral device (e.g., the Bluetooth speaker 803 communicatively connected to the vehicle device 802 or the external electronic device 102) of the external electronic device 102, or communication scheme information connectable with the peripheral device.

According to various embodiments of the disclosure, the external electronic device 102 may display a screen 800b asking the user whether to execute the music sharing service. The screen 800b may include service information (e.g., controlling the vehicle device 802) or an item (e.g., deny or allow) for selecting whether to activate the service. As the user selects the 'allow' item, the external electronic device 102 may activate the music sharing service and transmit information on whether to activate the service to the electronic device 101.

According to various embodiments of the disclosure, when identifying whether the service is activated in the external electronic device 102, the electronic device 101 may determine a communication scheme (e.g., BLE or Wi-Fi Aware) with the external electronic device 102 for a music sharing service based on the communication information. For example, when the peripheral device of the external electronic device 102 is identified as a caster device for service handover, the electronic device 101 may determine a communication scheme with the peripheral device for the music sharing service based on the communication information.

According to various embodiments of the disclosure, the electronic device 101 may transmit service handover information including information on the determined communication scheme to the external electronic device 102. For example, the external electronic device 102 may identify a communication scheme based on the service handover information, and may activate a music sharing service through the identified communication scheme with the electronic device 101.

According to various embodiments of the disclosure, the external electronic device 102 may cause a music sharing service to be performed by the peripheral device (e.g., 802 or 803) based on the service handover information. For example, the external electronic device 102 may identify a communication scheme for each peripheral device based on the service handover information, and may control the specific peripheral device (e.g., the vehicle device 802) to output music according to a music sharing service through the communication scheme.

Figure 9:
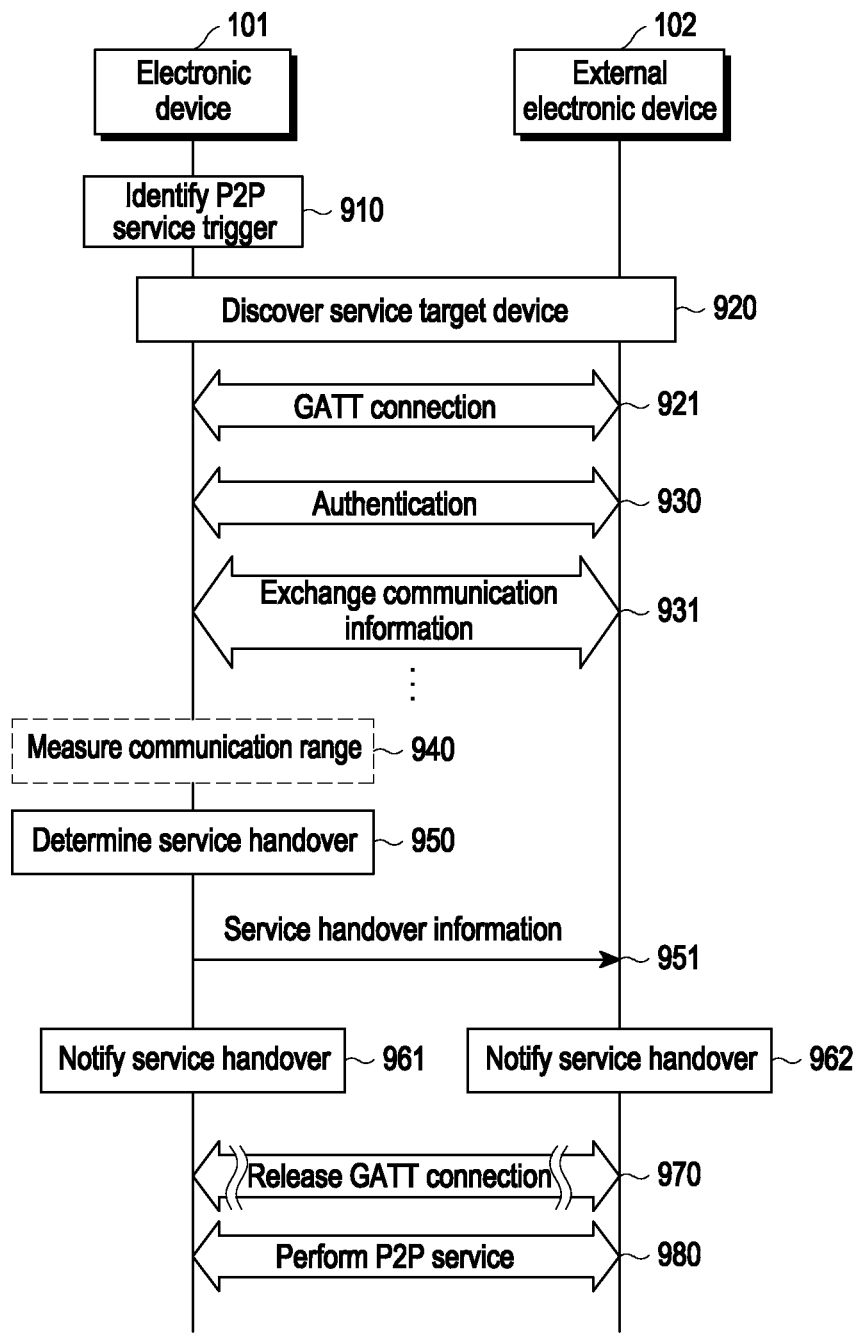
FIG. 9 is a flowchart illustrating an example of an operation of performing a P2P service in an electronic device according to an embodiment of the disclosure.

FIG. 9 is a flowchart illustrating an example of an operation of performing a P2P service in an electronic device according to an embodiment of the disclosure.

Referring to FIG. 9, in operation 910, the electronic device 101 may identify a P2P service trigger.

In operation 920, the electronic device 101 may discover a service target device to perform the triggered P2P service.

In operation 921, the electronic device 101 may establish a GATT connection with the external electronic device 102 by discovering the external electronic device 102 as a service target device.

In operation 930, the electronic device 101 may perform authentication on the external electronic device 102.

In operation 931, as authentication for the external electronic device 102 is completed, the electronic device 101 may exchange communication information with the external electronic device 102.

In operation 940, the electronic device 101 may measure a communication range with the external electronic device 102. For example, the electronic device 101 may determine whether the external electronic device 102 is located in a communication-capable range based on the exchanged communication information.

According to various embodiments of the disclosure, in the case of a specific P2P service triggered by contact between the electronic devices 101 and the external electronic device 102, the above-described operation of measuring the communication range may be omitted.

In operation 950, the electronic device 101 may determine a service handover. For example, the electronic device 101 may determine a specific communication scheme among communication schemes capable of P2P service with the external electronic device 102 based on the exchanged communication information, and may determine to perform the P2P service through the corresponding communication scheme.

According to various embodiments of the disclosure, the electronic device 101 may identify a communication scheme that is communicated with a specified communication quality (e.g., communication speed) among communication schemes and determine a service handover to the identified communication scheme. For example, in a case where the communication scheme of the specified communication quality cannot be identified, the electronic device 101 may control the P2P service to be performed using the specified communication scheme (e.g., Bluetooth or BLE).

In operation 951, the electronic device 101 may transmit service handover-related information to the external electronic device 102. For example, the service handover-related information may include configuration information related to a communication scheme or a corresponding communication scheme.

In operation 961, the electronic device 101 may transmit the identified service handover-related information to a server or an application related to the P2P service to notify the service handover.

In operation 962, the external electronic device 102 may transmit the received service handover-related information from the electronic device 101 to a server related to the P2P service or an application of the external electronic device 102 related to the P2P service to notify the service handover.

In operation 970, the electronic device 101 and the external electronic device 102 may release the GATT connection. For example, in a case where the BLE pairing operation is performed thereafter, the electronic device 101 and the external electronic device 102 may re-establish the GATT connection.

In operation 980, the electronic device 101 and the external electronic device 102 may perform the P2P service. For example, the electronic device 101 and the external electronic device 102 may perform the P2P service through the server and the application related to the P2P service.

Figure 10:
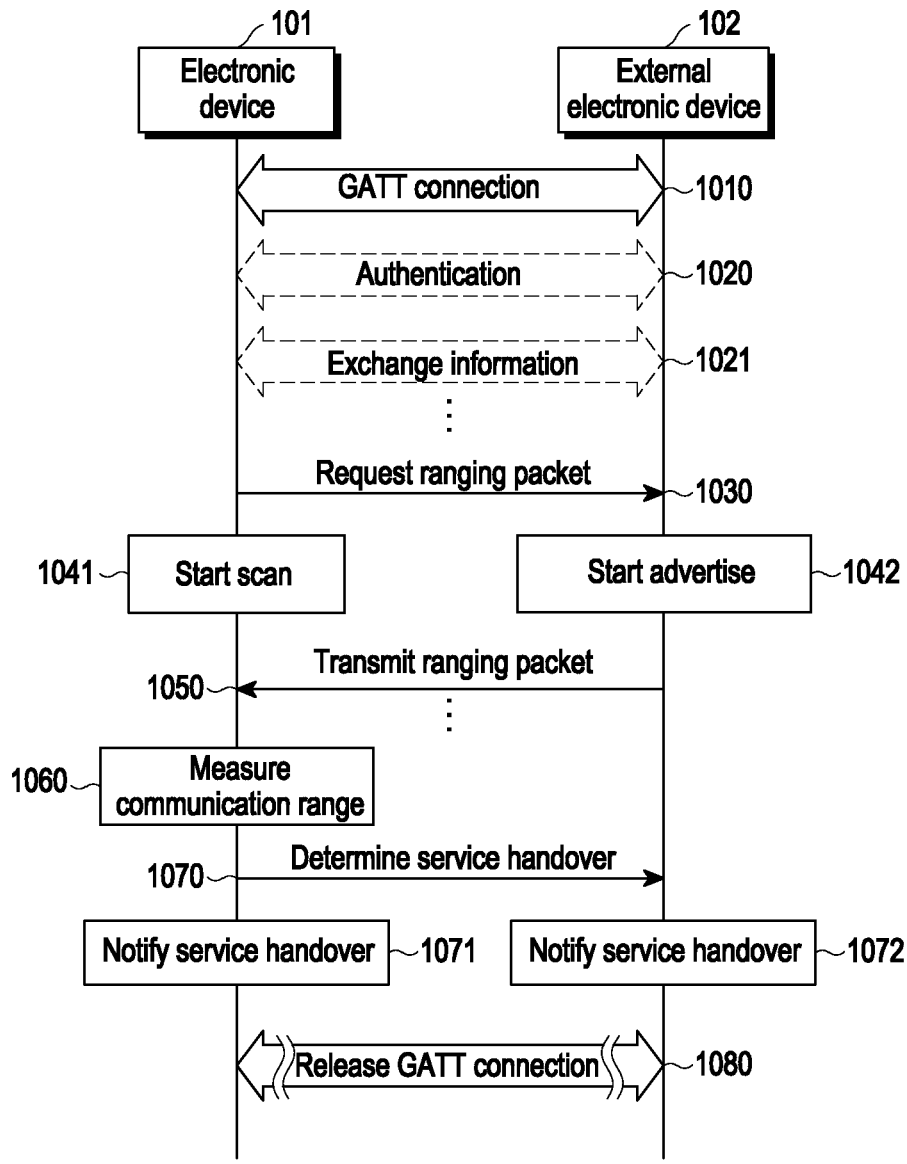
FIG. 10 is a flowchart illustrating an example of an operation of identifying a communication range with a service target device for a P2P service in an electronic device according to an embodiment of the disclosure.

FIG. 10 is a flowchart illustrating an example of an operation of identifying a communication range with a service target device for a P2P service in an electronic device according to an embodiment of the disclosure.

Referring to FIG. 10, in operation 1010, the electronic device 101 may establish a GATT connection with the external electronic device 102 that is a service target device of the P2P service.

In operation 1020, the electronic device 101 and the external electronic device 102 may perform mutual authentication.

In operation 1021, the electronic device 101 and the external electronic device 102 may exchange communication information as authentication is completed.

In operation 1030, the electronic device 101 may request a ranging packet from the external electronic device 102.

In operation 1041, the electronic device 101 may start scanning the ranging packet transmitted from the external electronic device 102. For example, the electronic device 101 may set the scan period as 100% duty.

In operation 1042, the external electronic device 102 may start the ranging packet advertisement as the ranging packet request of the electronic device 101 is identified. For example, the external electronic device 102 may be set to advertise with power of −45 dBm every 20 ms.

In operation 1050, the external electronic device 102 may transmit the ranging packet. For example, 50 packets may be advertised.

In operation 1060, the electronic device 101 may measure a communication range with the external electronic device 102. For example, the electronic device 101 may scan the advertised packet, predict the distance of the external electronic device 102 based on the size or communication speed of the scanned packet, and determine whether the external electronic device 102 is located within a communication range according to the predicted distance.

According to various embodiments of the disclosure, the electronic device 101 may receive a Bluetooth packet through a Bluetooth connection with the external electronic device 102, and may identify the communication range by measuring a reception value of the packet. In addition, the electronic device 101 may receive data through Wi-Fi Aware or UWB connection with the external electronic device 102 and measure a communication range with the external electronic device 102 based on the received data.

In operation 1070, as the external electronic device 102 determines that the external electronic device 102 is located within the communication range, the electronic device 101 may determine a service handover and transmit service handover-related information to the external electronic device 102.

In operation 1071, the electronic device 101 may transmit the service handover-related information to a server or an application related to the P2P service to notify the service handover.

In operation 1072, the external electronic device 102 may transmit the service handover-related information to a server or an application related to the P2P service to notify the service handover.

In operation 1080, the electronic device 101 and the external electronic device 102 may release the GATT connection. For example, in a case where the BLE pairing operation is performed thereafter, the electronic device 101 and the external electronic device 102 may re-establish the GATT connection.

Figure 11:
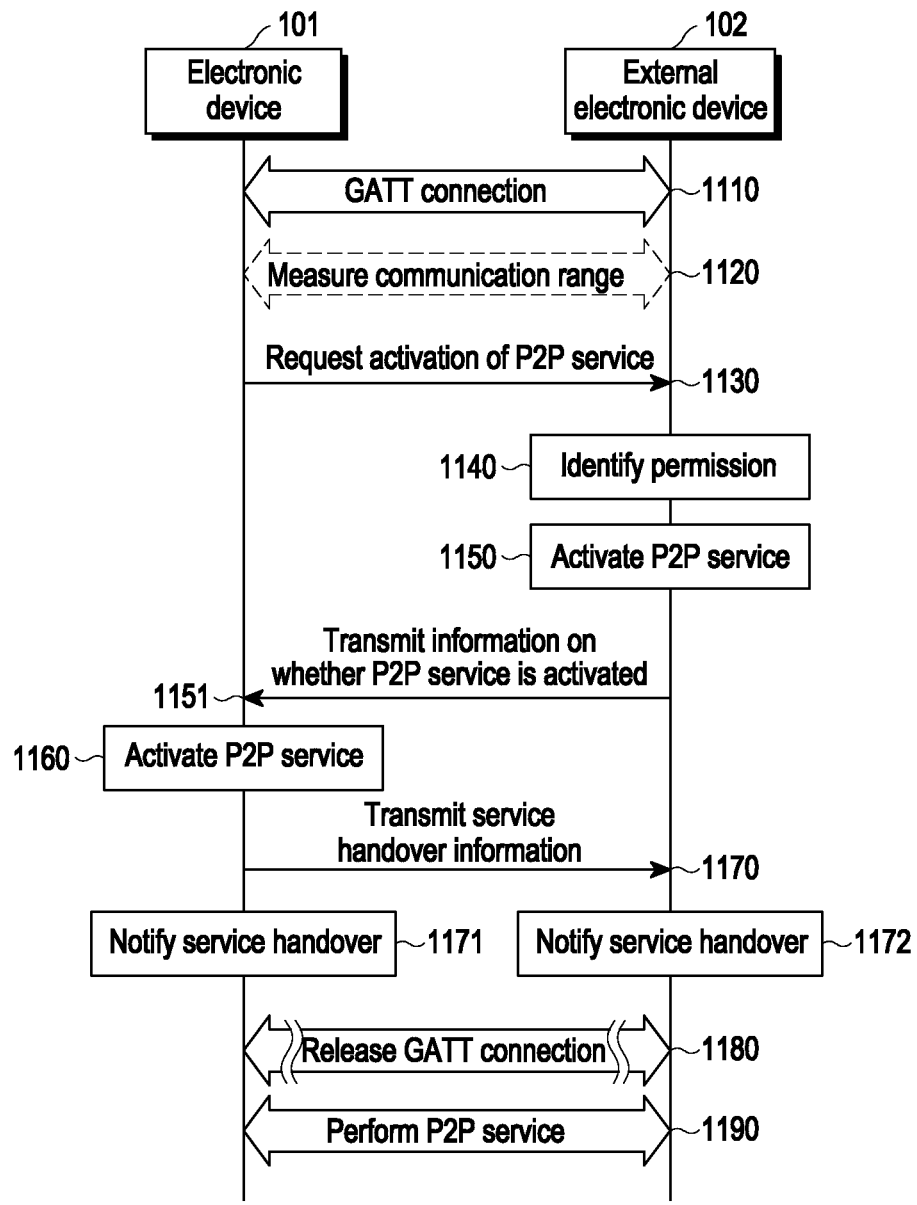
FIG. 11 is a flowchart illustrating an example of an operation of identifying whether a P2P service with a service target device is activated in an electronic device according to an embodiment of the disclosure.

FIG. 11 is a flowchart illustrating an example of an operation of identifying whether a P2P service with a service target device is activated in an electronic device according to an embodiment of the disclosure.

Referring to FIG. 11, the electronic device 101 may identify a P2P service request with the external electronic device 102 from a user (e.g., Tom). For example, the P2P service may control the external electronic device 102 or the peripheral device (e.g., a vehicle) of the external electronic device 102 through the electronic device 101.

In operation 1110, the electronic device 101 may establish the GATT connection with the external electronic device 102 as the P2P service request is identified.

In operation 1120, the electronic device 101 may measure a communication range with the external electronic device 102. For example, when it is possible to determine whether the P2P service is for controlling the vehicle device or the external electronic device 102 or the electronic device 101 is located inside the peripheral device (e.g., the vehicle) of the external electronic device 102, the above-described operation of measuring the communication range may be omitted.

In operation 1130, when it is determined that the external electronic device 102 is located within a communication range (e.g., inside the second electronic device), the electronic device 101 may request activation of the P2P service from the external electronic device 102.

According to various embodiments of the disclosure, the request for activation of the P2P service may be included in a TDS packet based on the TDS protocol and transmitted to the external electronic device 102.

In operation 1140, the external electronic device 102 may identify whether the user is permitted for the P2P service by identifying the P2P service activation request. For example, the external electronic device 102 may display a screen capable of responding to permission or rejection of the P2P service on a display (e.g., the display device 160 of FIG. 1).

According to various embodiments of the disclosure, the external electronic device 102 may display information (e.g., AAA car control by a user of the electronic device 101) on the P2P service requested from the electronic device 101 through the screen. For example, the user of the external electronic device 102 may select a button for responding to the permission or rejection to activate the P2P service.

In operation 1150, the external electronic device 102 may activate the P2P service as the permission response is input through the screen.

In operation 1151, the external electronic device 102 may include information on whether the P2P service is activated in the TDS packet and transmit the information to the electronic device 101.

In operation 1160, in a case where information on whether the P2P service is activated indicates service permission, the electronic device 101 may activate the P2P service.

In operation 1170, the electronic device 101 may transmit service handover-related information to the external electronic device 102. For example, the service handover-related information may include account information of a communication scheme or an application in which the P2P service is performed.

In operation 1171, the electronic device 101 may transmit the identified service handover-related information to a server or an application related to the P2P service to notify the service handover.

In operation 1172, the external electronic device 102 may transmit the received service handover-related information from the electronic device 101 to a server or an application related to the activated P2P service to notify the service handover.

According to various embodiments of the disclosure, in a case where the P2P service is for performing the music streaming service in the electronic device 101 in the external electronic device 102 (or the peripheral device of the external electronic device 102), the external electronic device 102 may access a server or an application of the corresponding service through the account information of the service to perform the service of the electronic device 101 through the external electronic device 102.

In operation 1180, the electronic device 101 and the external electronic device 102 may release the GATT connection. For example, in a case where the BLE pairing operation is performed thereafter, the electronic device 101 and the external electronic device 102 may re-establish the GATT connection.

In operation 1190, the electronic device 101 and the external electronic device 102 may perform the P2P service through a server or an application of the activated P2P service. For example, the music streaming service in the electronic device 101 is handed over to the external electronic device 102, and the external electronic device 102 may control the music streaming service to be performed through the external electronic device 102 or a peripheral device (for example, a AAA car).

Figure 12:
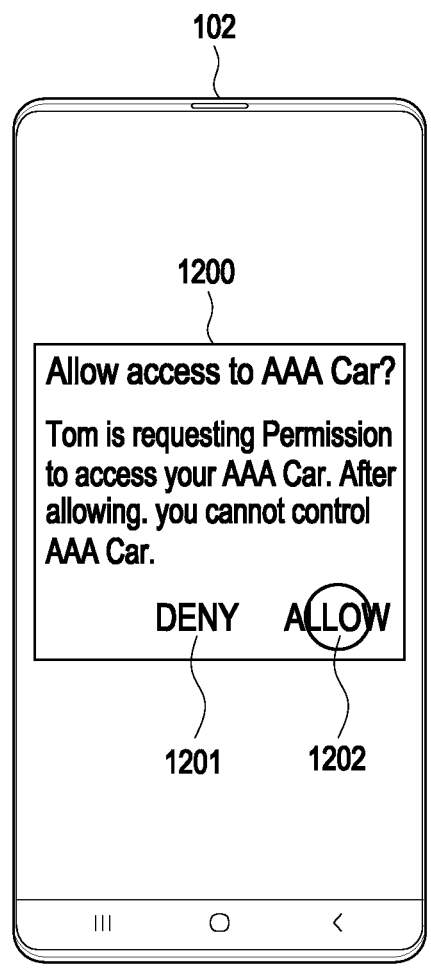
FIG. 12 is a diagram illustrating an example of a screen configuration for identifying whether a P2P service is permitted according to an embodiment of the disclosure.

FIG. 12 is a diagram illustrating an example of a screen configuration for identifying whether a P2P service is permitted according to an embodiment of the disclosure.

Referring to FIG. 12, upon receiving a P2P service activation request from the electronic device 101, the external electronic device 102 may display a screen 1200 for asking the user for permission to activate the P2P service on a display (e.g., the display device 160 of FIG. 1).

According to various embodiments of the disclosure, the screen 1200 may include content informing that the user (e.g., 'Tom') of the electronic device 101 requests a P2P service (e.g., AAA car control via Bluetooth communication) with a peripheral device (e.g., 'AAA car') of the external electronic device 102, the deny button 1201 for inputting a rejection response to the P2P service, or the allow button 1202 for inputting a permission response to the P2P service.

According to various embodiments of the disclosure, as the user of the external electronic device 102 inputs the allow button 1202, the external electronic device 102 may activate the P2P service and notify the electronic device 101 whether the P2P service is activated. For example, as the electronic device 101 identifies whether the P2P service is activated, the service handover is performed to the AAA car, and the electronic device 101 may perform the P2P service with the AAA car.

Figure 13:
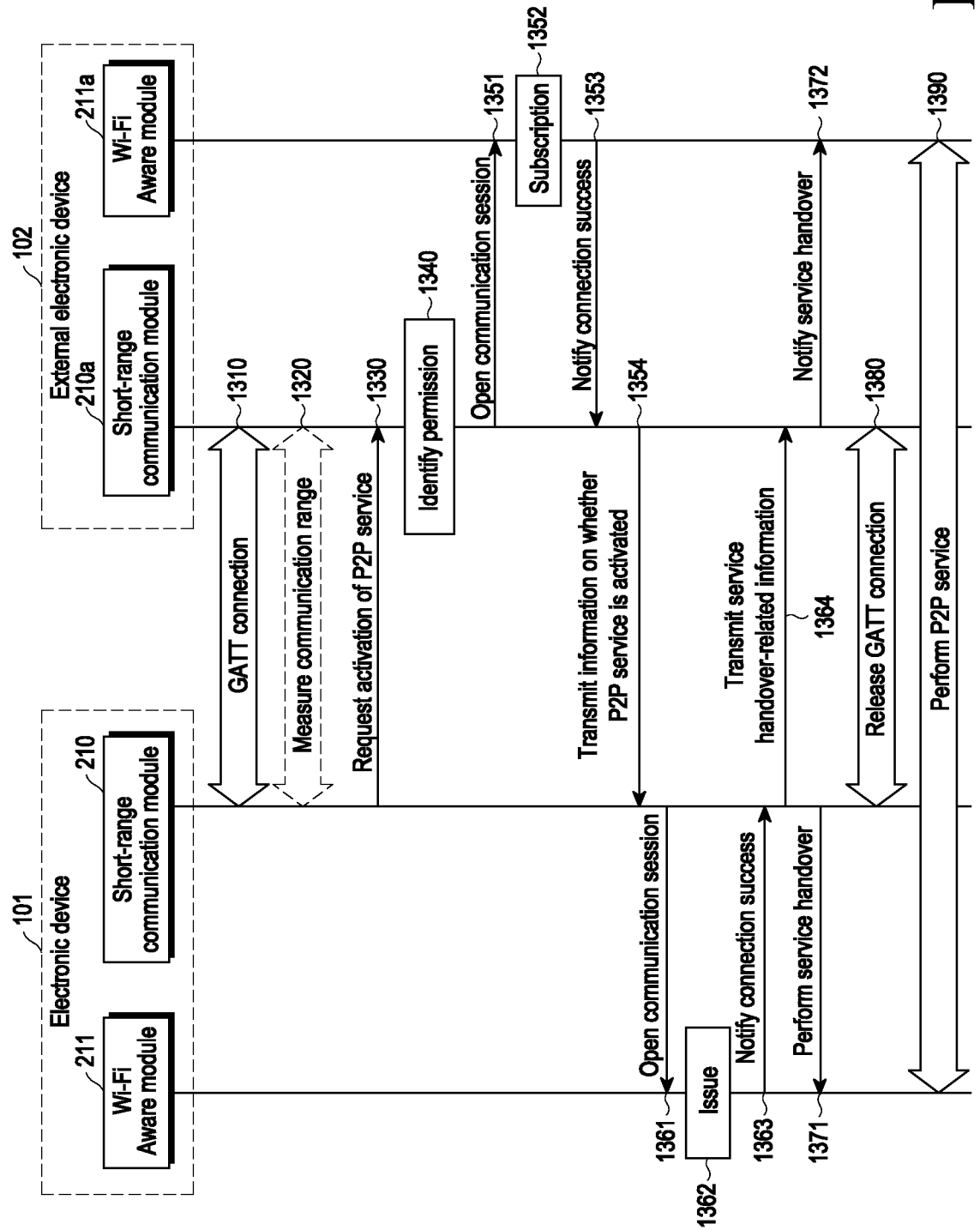
FIG. 13 is a flowchart illustrating an example of an operation of identifying whether a P2P service with a service target device is activated in an electronic device according to an embodiment of the disclosure.

FIG. 13 is a flowchart illustrating an example of an operation of identifying whether a P2P service with a service target device is activated in an electronic device according to an embodiment of the disclosure.

According to various embodiments of the disclosure, the electronic device 101 and the external electronic device 102 may include a short-range communication module (e.g., 210 or 210a). For example, the short-range communication module (e.g., 210 or 210a) may include a Wi-Fi Aware module (e.g., 211 or 211a) or a Wi-Fi Direct module (e.g., 212).

Referring to FIG. 13, in operation 1310, the electronic device 101 may establish a GATT connection with the external electronic device 102.

In operation 1320, the electronic device 101 may measure a communication range with the external electronic device 102. For example, when it is possible to determine whether the external electronic device 102 is connected to the vehicle device and the electronic device 101 is located inside the vehicle device connected to the external electronic device 102, or when the P2P service is triggered by contact with the external electronic device 102, the operation of measuring the above-described communication range may be omitted.

In operation 1330, when it is determined that the external electronic device 102 is located within a communication range (e.g., inside the vehicle device), the electronic device 101 may request activation of the P2P service from the external electronic device 102. For example, the P2P service activation request may be included in a TDS packet and transmitted to the external electronic device 102.

In operation 1340, the external electronic device 102 may identify whether the user is permitted for the P2P service by identifying the P2P service activation request. For example, the external electronic device 102 may display a screen capable of responding to permission or rejection of the P2P service, and activate the P2P service as the permission response is input through the screen.

In operation 1351, in a case where the information on whether the P2P service is activated indicates service permission, the external electronic device 102 may control the Wi-Fi Aware module 211a (or Wi-Fi Direct module 212) to open a communication session to activate the P2P service. For example, the short-range communication module 210a may request the Wi-Fi Aware module 211a to open a communication session or control the Wi-Fi Direct module 212 to initiate Wi-Fi Direct communication.

In operation 1352, the Wi-Fi Aware module 211a of the external electronic device 102 may perform control for subscribing to a corresponding service according to a communication session opening request.

According to various embodiments of the disclosure, the short-range communication module 210a may transmit the communication session open request to the Wi-Fi Direct module 212, and the Wi-Fi Direct module 212 may search for a device connectable through Wi-Fi Direct by performing peer discovery and connection, and may be configured to be connected to the searched device.

In operation 1353, the Wi-Fi Aware module 211a (or Wi-Fi Direct module 212) of the external electronic device 102 may transmit connection information including information related to a service subscription to the short-range communication module 210a. For example, a connection success notification may be transmitted.

In operation 1354, the external electronic device 102 may include information on whether the P2P service is activated in the TDS packet and transmit the information to the electronic device 101.

In operation 1361, in a case where the information on whether the P2P service is activated indicates service permission, the electronic device 101 may control the Wi-Fi Aware module 211 (or Wi-Fi Direct module 212) to open a communication session to activate the P2P service. For example, the short-range communication module 210 may request the Wi-Fi Aware module 211 to open a communication session or control the Wi-Fi Direct module 212 to initiate Wi-Fi Direct communication.

In operation 1362, the Wi-Fi Aware module 211 of the electronic device 101 may perform control for publishing a corresponding service according to a communication session opening request. According to various embodiments of the disclosure, the short-range communication module 210 may transmit the communication session opening request to the Wi-Fi Direct module 212 and the Wi-Fi Direct module 212 may search for a device connectable through Wi-Fi Direct by performing peer discovery and connection, and may be configured to be connected to the searched device.

In operation 1363, the Wi-Fi Aware module 211 (or Wi-Fi Direct module 212) of the electronic device 101 may transmit connection information including information related to an issuing service to the short-range communication module 210a. For example, a connection success notification may be transmitted.

In operation 1364, the electronic device 101 may transmit service handover-related information to the external electronic device 102.

In operation 1371, the electronic device 101 may transmit the identified service handover-related information to the Wi-Fi Aware module 211 to request to perform the service handover. For example, the Wi-Fi Aware module 211 may transmit the service handover-related information to a server or an application related to a P2P service.

In operation 1372, the external electronic device 102 may transmit the identified service handover-related information to the Wi-Fi Aware module 211*a* to request to perform the service handover. For example, the Wi-Fi Aware module 211*a* may transmit the service handover-related information to a server or an application related to a P2P service.

In operation 1380, the electronic device 101 and the external electronic device 102 may release the GATT connection. For example, in a case where the BLE pairing operation is performed thereafter, the electronic device 101 and the external electronic device 102 may re-establish the GATT connection.

In operation 1390, the Wi-Fi Aware module 211 of the electronic device 101 and the Wi-Fi Aware module 211*a* of the external electronic device 102 may perform the P2P service through an activated P2P service server or application.

Figure 14:
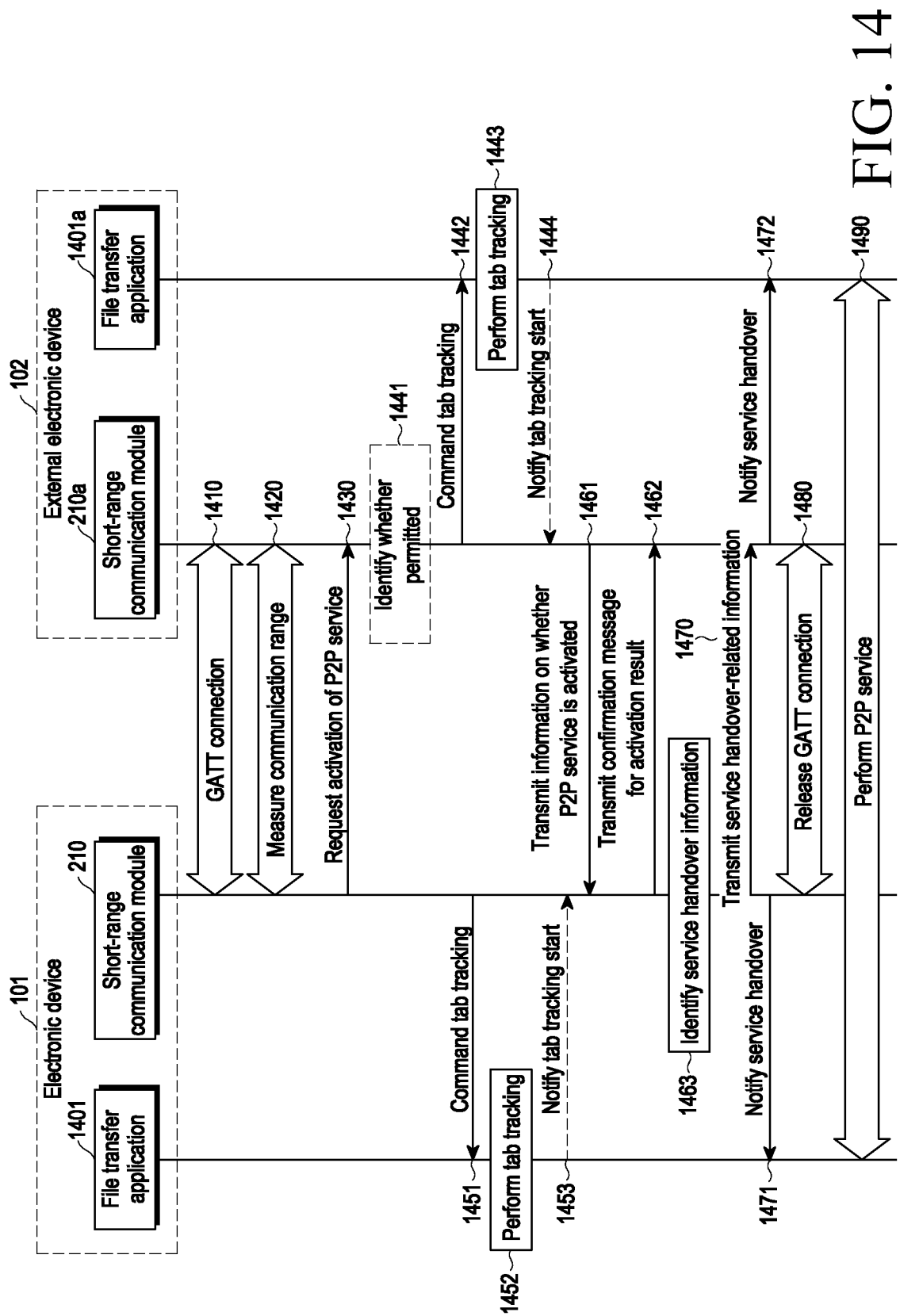
FIG. 14 is a flowchart illustrating an example of an operation of identifying whether a P2P service with a service target device is activated in an electronic device according to an embodiment of the disclosure.

FIG. 14 is a flowchart illustrating an example of an operation of identifying whether a P2P service with a service target device is activated in an electronic device according to an embodiment of the disclosure.

According to various embodiments of the disclosure, the electronic device 101 and the external electronic device 102 may include a file transfer application 1401 or 1401*a* that performs file transfer by a short-range communication module (e.g., 210 or 210*a*) or a tap-to-share function (e.g., an Insync function). The file transfer application 1401 or 1401*a* may be a gallery application for sharing a file stored in a server or a cloud with the electronic device 101 or the external electronic device 102.

According to various embodiments of the disclosure, it may be identified that the P2P service (e.g., at least one image transfer) is requested as the user of the electronic device 101 executes the file transfer application 1401 and selects at least one image to be transmitted to at least one external electronic device (e.g., 102). For example, the electronic device 101 may identify that the user selects at least one external electronic device to transmit the at least one image together with the selection of the at least one image.

According to various embodiments of the disclosure, subsequent operations 1410 to 1490 are described as operations of the electronic device 101 and the external electronic device 102, but operations 1410 to 1490 may be respectively performed with a plurality of external electronic devices (e.g., the external electronic device 102) to which the electronic device 101 intends to perform the P2P service.

Referring to FIG. 14, in operation 1410, the electronic device 101 may establish a GATT connection with the external electronic device 102 through the short-range communication module 210.

In operation 1420, the electronic device 101 may measure a communication range with the external electronic device 102 through the short-range communication module 210. For example, when it is possible to determine whether the electronic device 101 is located inside the external electronic device 102 which is the vehicle device or when the P2P service is triggered by contact with the external electronic device 102, the operation of measuring the above-described communication range may be omitted.

In operation 1430, when it is determined that the external electronic device 102 is located within a communication range (e.g., inside the second electronic device), the electronic device 101 may request activation of the P2P service from the external electronic device 102 through the short-range communication module 210. For example, the P2P service activation request may be included in a TDS packet and transmitted to the external electronic device 102.

In operation 1441, the short-range communication module 210*a* of the external electronic device 102 may identify whether the user is permitted for the P2P service by identifying the P2P service activation request. For example, each of the plurality of external electronic devices (e.g., 102) may display a screen capable of responding to permission or rejection of the P2P service, and activate the P2P service as the permission response is input through the screen.

In operation 1442, the external electronic device 102 may transmit a tap tracking command to the file transfer application 1401*a* to perform a tap tracking function of identifying a file to be transmitted to the electronic device 101 contacting the external electronic device 102 as the external electronic device 102 transmits the P2P service activation request. For example, the short-range communication module 210*a* may transmit the tap tracking command to the file transfer application 1401*a*.

In operation 1443, the file transfer application 1401*a* of the external electronic device 102 may identify at least one image to be transmitted to the electronic device 101 according to the tap tracking command.

In operation 1444, the file transfer application 1401*a* of the external electronic device 102 may notify the short-range communication module 210*a* that tap tracking has started.

In operation 1451, the electronic device 101 may transmit the tap tracking command to the file transfer application 1401 to perform the tap tracking function of identifying a file to be transmitted to the external electronic device 102 contacting the electronic device 101 according to the P2P service activation request. For example, the short-range communication module 210 may transmit the tap tracking command to the file transfer application 1401.

In operation 1452, the file transfer application 1401 of the electronic device 101 may perform tap tracking for identifying a file to be transmitted through the corresponding application according to the tap tracking command.

In operation 1453, the file transfer application 1401 of the electronic device 101 may notify the short-range communication module 210 that tap tracking has started.

In operation 1461, the external electronic device 102 may include information (e.g., a success notification for service activation) on whether the P2P service is activated in the TDS packet and transmit the information to the electronic device 101.

In operation 1462, the electronic device 101 may transmit a confirmation message indicating that the P2P service activation result (e.g., success for service activation) received from the external electronic device 102 is identified to the external electronic device 102.

In operation 1463, the electronic device 101 may identify service handover information for handover of the P2P service with at least one external electronic device (e.g., 102). For example, the service handover information may include information related to a communication scheme in which the P2P service is performed and a communication configuration related to the communication scheme for each of the at least one external electronic device (e.g., 102).

According to various embodiments of the disclosure, the service handover related information may include information indicating that the P2P service is performed through Wi-Fi Aware in the external electronic device 102 and that the P2P service is performed through Wi-Fi Direct in another external electronic device.

In operation 1470, the electronic device 101 may transmit identified service handover-related information to the external electronic device 102. For example, the electronic device 101 may transmit corresponding service handover-related information to at least one external electronic device.

In operation 1471, the short-range communication module 210 of the electronic device 101 may notify the identified service handover-related information to the file transfer application 1401.

In operation 1472, the short-range communication module 210a of the external electronic device 102 may notify the identified service handover related information to the file transfer application 1401a.

According to various embodiments of the disclosure, the file transfer application 1401 or 1401a may perform the P2P service by using a communication scheme included in the service handover-related information.

In operation 1480, the short-range communication module 210 of the electronic device 101 and the short-range communication module 210a of the external electronic device 102 may release the GATT connection. For example, in a case where the BLE pairing operation is performed thereafter, the electronic device 101 and the external electronic device 102 may re-establish the GATT connection.

In operation 1490, the electronic device 101 and the external electronic device 102 may perform the P2P service through the file transfer application 1401 of the electronic device 101 and the file transfer application 1401a of the external electronic device 102.

According to various embodiments of the disclosure, the electronic device 101 may perform the service handover based on a communication scheme supported by at least one external electronic device (e.g., 102). For example, the electronic device 101 may perform the P2P service with the external electronic device 102 through Wi-Fi Aware, and may perform the P2P service with another external electronic device through Wi-Fi Direct.

Figure 15:
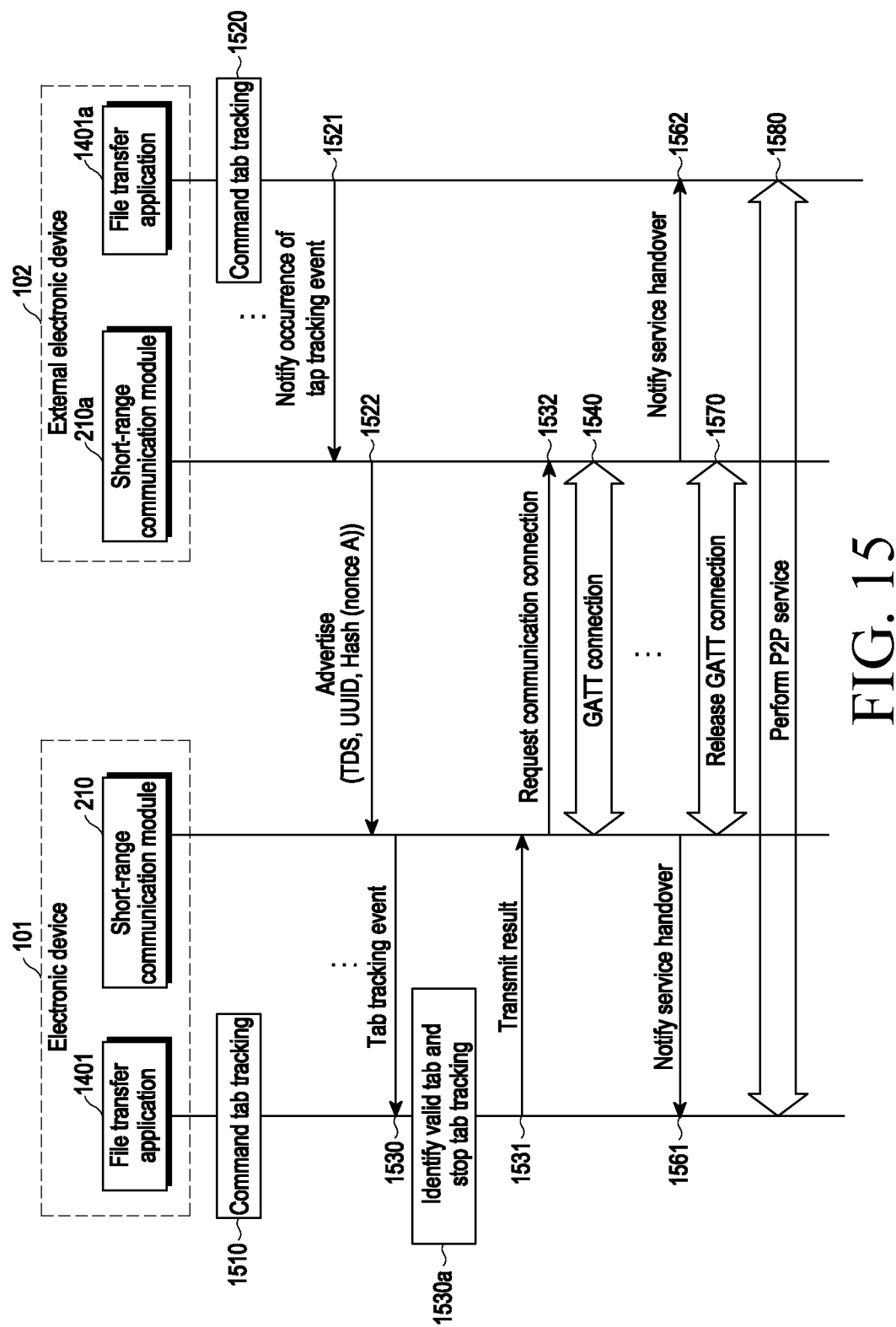
FIG. 15 is a flowchart illustrating an example of an operation of identifying whether a P2P service with a service target device is activated in an electronic device according to an embodiment of the disclosure.

FIG. 15 is a flowchart illustrating an example of an operation of identifying whether a P2P service with a service target device is activated in an electronic device according to an embodiment of the disclosure.

According to various embodiments of the disclosure, the electronic device 101 and the external electronic device 102 may include the short-range communication module (e.g., 210 or 210a) or the file transfer application 1401 or 1401a.

Referring to FIG. 15, in operation 1510, the file transfer application 1401 of the electronic device 101 may identify a tap tracking command. For example, the file transfer application 1401 may determine that the tap tracking operation is triggered through the sensor of the electronic device 101 as the electronic device 101 and the external electronic device 102 contact each other.

In operation 1520, the file transfer application 1401a of the external electronic device 102 may identify a tap tracking command. For example, the file transfer application 1401a may determine that the tap tracking operation is triggered as the external electronic device 102 and an external electronic device (e.g., the electronic device 101) contact each other.

In operation 1521, the file transfer application 1401a of the external electronic device 102 may notify the occurrence of a tap tracking event to the short-range communication module 210a of the external electronic device 102.

In operation 1522, the short-range communication module 210a of the external electronic device 102 may advertise a notification indicating the occurrence of the tap tracking event to the electronic device 101. For example, the notification may be included in a TDS packet and may include UUID or hash data.

In operation 1530, the short-range communication module 210 of the electronic device 101 may notify the occurrence of the tap tracking event to the file transfer application 1401 of the electronic device 101 by identifying the advertised notification from the external electronic device 102. For example, the tab tracking event may be a notification of a tab tracking event detected by the external electronic device 102 through a sensor of the external electronic device 102.

In operation 1530a, the file transfer application 1401 of the electronic device 101 may stop tab tracking by identifying a valid tab and a file to be transmitted to the external electronic device 102.

In operation 1531, the file transfer application 1401 of the electronic device 101 may transmit a result including information on the valid tab identified by the short-range communication module 210.

In operation 1532, the electronic device 101 may request a communication connection for service handover from the external electronic device 102 through the short-range communication module 210.

In operation 1540, the electronic device 101 may establish a GATT connection with the external electronic device 102 for service handover through the short-range communication module 210.

In operation 1561, the electronic device 101 may notify the identified service handover-related information to the file transfer application 1401.

In operation 1562, the external electronic device 102 may notify the identified service handover-related information to the file transfer application 1401a.

In operation 1570, the electronic device 101 and the external electronic device 102 may release the GATT connection through the short-range communication module 210 or 210a. For example, in a case where the BLE pairing operation is performed thereafter, the electronic device 101 and the external electronic device 102 may re-establish the GATT connection.

In operation 1580, the electronic device 101 and the external electronic device 102 may perform the P2P service through the file transfer application 1401 of the electronic device 101 and the file transfer application 1401a of the external electronic device 102.

Figure 16:
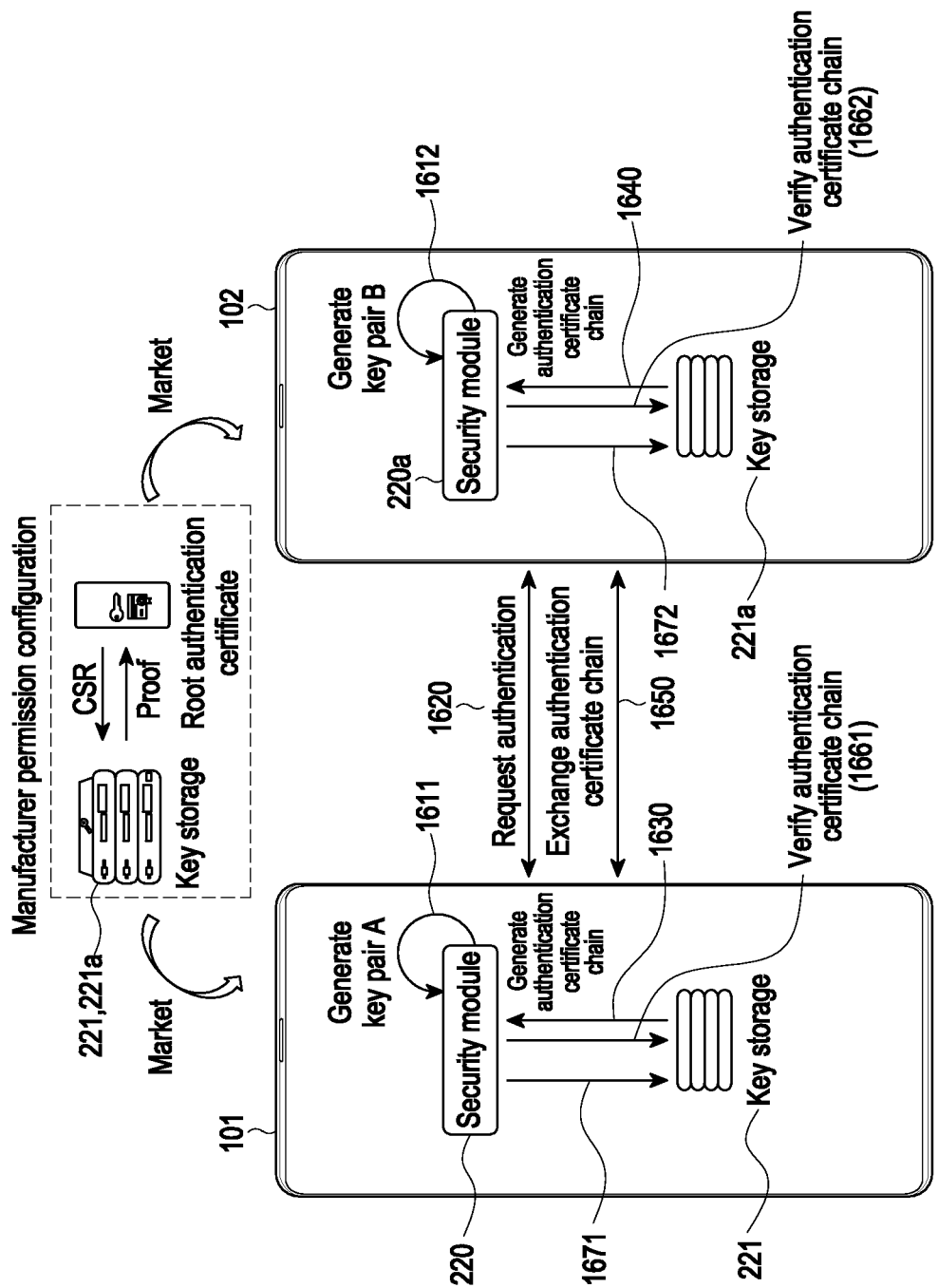
FIG. 16 is a flowchart illustrating an example of an operation of performing authentication in a P2P service between electronic devices according to an embodiment of the disclosure.

FIG. 16 is a flowchart illustrating an example of an operation of performing authentication in a P2P service between electronic devices according to an embodiment of the disclosure.

According to various embodiments of the disclosure, a manufacturer of the electronic device 101 or the external electronic device 102 may include a key storage 221 or 221a to market the electronic device 101 or the external electronic device 102. For example, the key storage 221 or 221a may identify an authentication certificate signing request (CSR) for a root authentication certificate and prove the authentication certificate signature to authenticate the received key or authentication certificate chain through the root authentication certificate.

Referring to FIG. 16, electronic devices (e.g., electronic device 101 or external electronic device 102) performing a P2P service may generate a key pair consisting of a pair of a private key and a public key.

According to various embodiments of the disclosure, in operation 1611, the security module 220 of the electronic device 101 may generate a key pair A consisting of a pair of a private key A and a public key A. In operation 1612, the security module 220a of the external electronic device 102 may generate a key pair B consisting of a pair of a private key B and a public key B.

In operation 1620, the electronic device 101 or the external electronic device 102 may request authentication from the counterpart device. For example, the electronic device issuing the P2P service may transmit an authentication request including a public key (e.g., the public key A or the public key B) to the electronic device subscribing to the P2P service.

In operation 1630, the electronic device 101 may generate an authentication certificate chain by using the received public key B of the external electronic device 102.

In operation 1640, the external electronic device 102 may generate an authentication certificate chain by using the received public key A of the electronic device 101.

In operation 1650, the electronic device 101 and the external electronic device 102 may exchange the generated authentication certificate chain with the counterpart device.

In operation 1661, the electronic device 101 may verify the received authentication certificate chain through the root authentication certificate stored in the key storage 221.

In operation 1662, the external electronic device 102 may verify the received authentication certificate chain through the root authentication certificate stored in the key storage 221a.

According to various embodiments of the disclosure, the electronic device 101 and the external electronic device 102 may complete authentication with respect to the counterpart device based on a result of verifying the authentication certificate chain through the root authentication certificate of each device.

In operation 1671, the security module 220 of the electronic device 101 may generate a shared key according to the verification result of the authentication certificate chain.

In operation 1672, the security module 220a of the external electronic device 102 may generate a shared key according to the verification result of the authentication certificate chain.

The electronic device 101 or the external electronic device 102 according to various embodiments of the disclosure may complete authentication with respect to the counterpart device according to verification of the authentication certificate chain, and may generate a shared key using a private key (e.g., a private key A or a private key B) based on the key generation rule of the Elliptic-curve Diffie-Hellman (ECDH). For example, the shared key may be used to decrypt data of the external electronic device 102 by hashing with the SHA-256 algorithm.

According to various embodiments of the disclosure, as the electronic device (e.g., electronic device 101 or external electronic device 102) performs authentication by using a public key and an authentication certificate chain of an external electronic device mutually authenticated by using a root authentication certificate, even if an MITM attacker steals the public key or authentication certificate, decryption is impossible, so it is possible to effectively prevent man-in-the-middle attacks.

Figure 17:
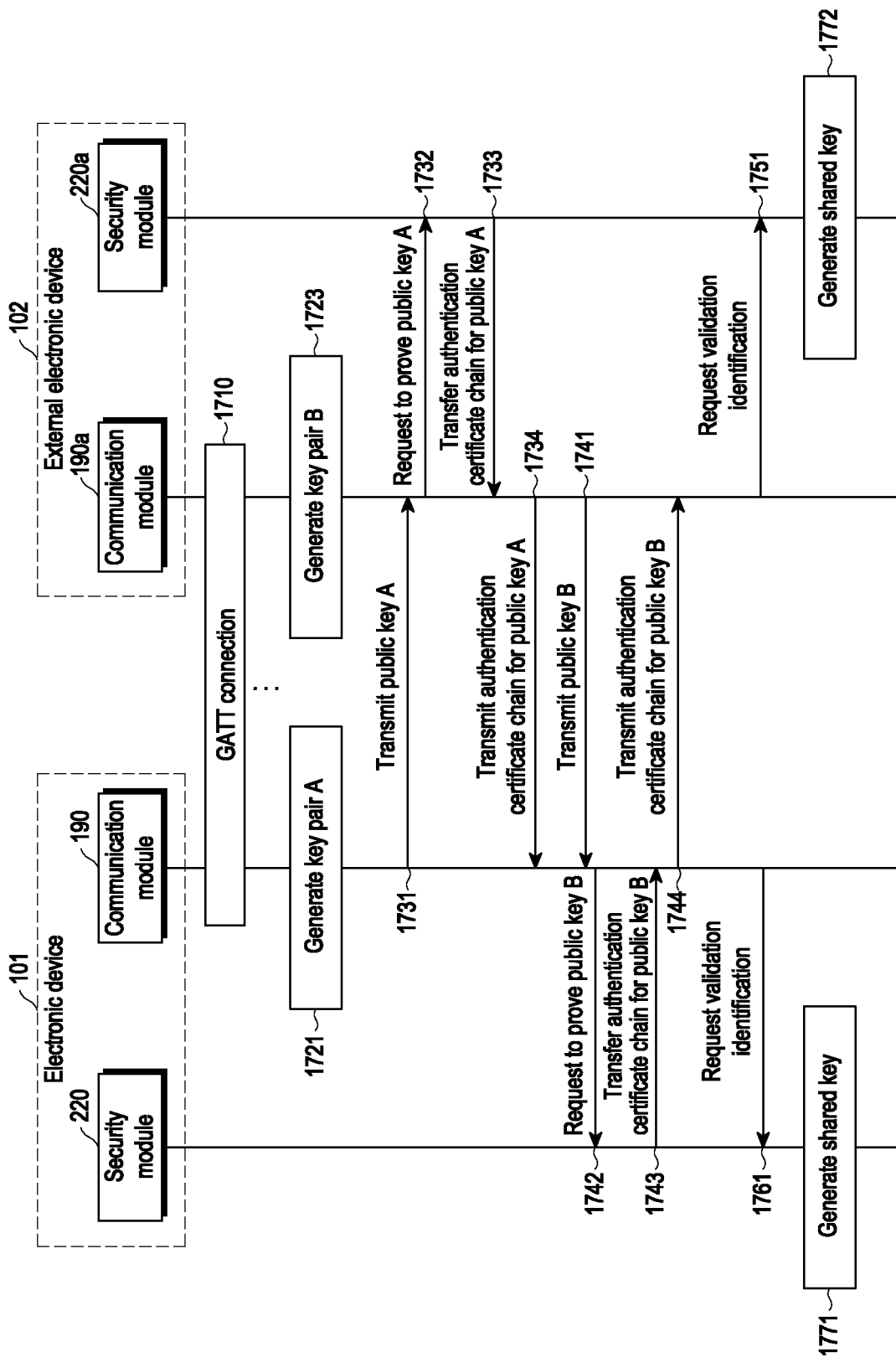
FIG. 17 is a flowchart illustrating an example of an operation of performing authentication in a P2P service between electronic devices according to an embodiment of the disclosure.

FIG. 17 is a flowchart illustrating an example of an operation of performing authentication in a P2P service between electronic devices according to an embodiment of the disclosure.

According to various embodiments of the disclosure, the electronic device 101 or the external electronic device 102 may include a communication module 190 or 190a or a security module 220 or 220a. The security module 220 or 220a may include the key storage 221 or 221a or is functionally connected to the key storage 221 or 221a to verify the key or the authentication certificate chain received from the counterpart device by using the authentication certificate stored in the key storage 221 or 221a.

Referring to FIG. 17, in operation 1710, electronic devices (e.g., the electronic devices 101 or the external electronic devices 102) performing a P2P service may establish a GATT connection with each other.

In operation 1721, the electronic device 101 may generate a key pair A consisting of a pair of the private key A and the public key A.

In operation 1723, the external electronic device 102 may generate a key pair B consisting of a pair of the private key B and the public key B.

In operation 1731, the electronic device 101 may transmit the public key A to the external electronic device 102 through the GATT connection for authentication of the public key A.

In operation 1732, as the external electronic device 102 receives the public key A from the electronic device 101, the external electronic device 102 may request the security module 220a of the external electronic device 102 to prove the public key A.

In operation 1733, the security module 220a of the external electronic device 102 may issue an authentication certificate chain for the public key A and transmit the authentication certificate chain to the communication module 190a.

In operation 1734, the external electronic device 102 may transmit the authentication certificate chain for the public key A to the electronic device 101.

In operation 1741, the external electronic device 102 may transmit the public key B to the electronic device 101 through the GATT connection for authentication of the public key B.

In operation 1742, as the electronic device 101 receives the public key B from the external electronic device 101, the electronic device 101 may request the security module 220 of the external electronic device 102 to prove the public key B.

In operation 1743, the security module 220 of the electronic device 101 may issue an authentication certificate chain for the public key B and transmit the authentication certificate chain to the communication module 190.

In operation 1744, the electronic device 101 may transmit the authentication certificate chain for the public key B to the external electronic device 102.

In operation 1751, the external electronic device 102 may transmit a validation request for the authentication certificate chain for the public key B received from the electronic device 101 to the security module 220a.

According to various embodiments of the disclosure, the security module 220a may verify the validation of the authentication certificate chain for the public key B by using the root authentication certificate stored in the key storage 221.

In operation 1772, when the authentication certificate chain for the public key B is verified as valid, the security module 220a of the external electronic device 102 may generate a shared key that may be used in common with the electronic device 101.

In operation 1761, the electronic device 101 may request the security module 220 to verify the validity of the authentication certificate chain for the public key A received from the external electronic device 102.

According to various embodiments of the disclosure, the security module 220 may verify the validation of the authentication certificate chain for the public key A by using the root authentication certificate stored in the key storage 221.

In operation 1771, when the authentication certificate chain for the public key A is verified as valid, the security module 220 of the electronic device 101 may generate a shared key that may be used in common with the external electronic device 102.

According to various embodiments of the disclosure, the order of operations 1731 to 1772 may be changed. For example, after the electronic device 101 transmits the public key A to the external electronic device 102 through operation 1731, the external electronic device 102 may transmit the public key B to the electronic device 101 through operation 1741.

Figure 18:
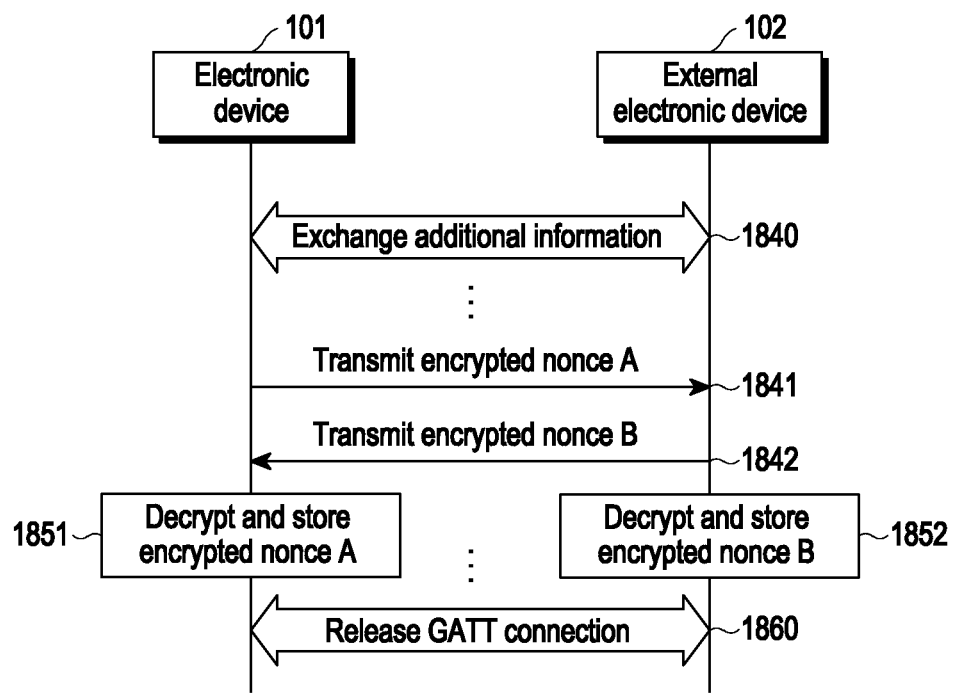
FIG. 18 is a flowchart illustrating an example of an operation of performing authentication in a P2P service between electronic devices according to an embodiment of the disclosure.

FIG. 18 is a flowchart illustrating an example of an operation of performing authentication in a P2P service between electronic devices according to an embodiment of the disclosure.

Referring to FIG. 18, the electronic device 101 and the external electronic device 102 may establish a GATT connection and exchange authentication information through the GATT connection to perform authentication with respect to the counterpart device.

In operation 1840, the electronic device 101 and the external electronic device 102 may exchange additional information. For example, the additional information may include communication scheme information that the corresponding electronic device desires to connect to the counterpart device or configuration information related to a specific communication scheme.

In operation 1841, the electronic device 101 may transmit the nonce A encrypted with the shared key to the external electronic device 102.

In operation 1842, the external electronic device 102 may transmit the nonce B encrypted with the shared key to the electronic device 101.

According to various embodiments of the disclosure, the nonce A and the nonce B are randomly generated by each electronic device, and may be mapped and stored together with a time stamp.

In operation 1851, the electronic device 101 may store the received encrypted nonce B by decrypting the nonce B with the shared key.

In operation 1852, the external electronic device 102 may store the received encrypted nonce A by decrypting the nonce A with the shared key.

In operation 1860, the electronic device 101 and the second external electronic device 102 may release the GATT connection.

Figure 19:
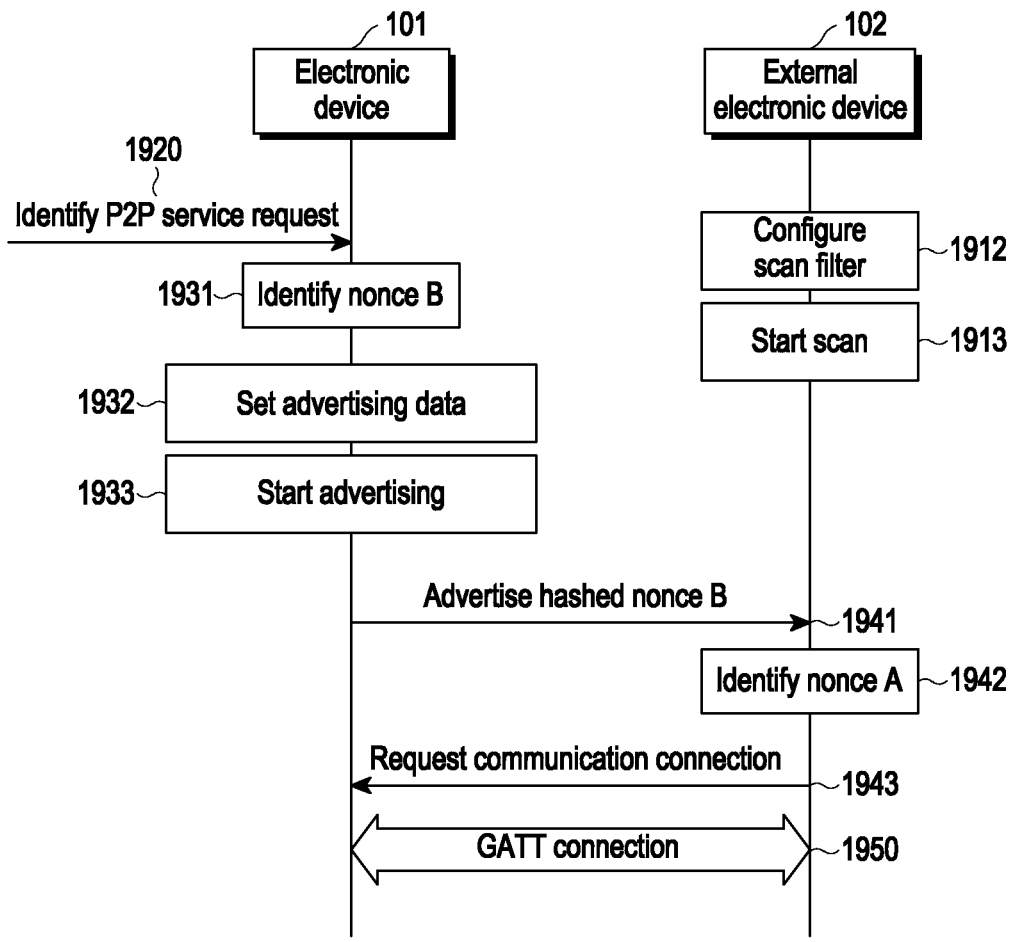
FIG. 19 is a flowchart illustrating an example of an operation of performing a service handover by performing authentication in a P2P service between electronic devices according to an embodiment of the disclosure.

FIG. 19 is a flowchart illustrating an example of an operation of performing a service handover by performing authentication in a P2P service between electronic devices according to an embodiment of the disclosure.

Referring to FIG. 19, in operation 1912, the external electronic device 102 may configure a scan filter.

In operation 1913, the external electronic device 102 may perform a scan based on the configured scan filter.

In operation 1920, the electronic device 101 may identify that a P2P service is requested.

In operation 1931, the electronic device 101 may identify the stored nonce B. For example, the nonce B may be encrypted and received from the external electronic device 102, and may be decrypted and stored by using a shared key commonly generated with the external electronic device 102.

In operation 1932, the electronic device 101 may set advertising data. For example, the electronic device 101 may set the advertising data to include the TDS UUID and the hashed nonce B.

In operation 1933, the electronic device 101 may determine the start of advertising as the service handover for the P2P service is determined.

In operation 1941, the electronic device 101 may advertise advertising data including the TDS UUID and the hashed nonce B.

In operation 1942, the external electronic device 102 may identify the stored nonce A. For example, the external electronic device 102 may identify a timestamp for the nonce B stored in the external electronic device 102 and may identify the nonce A including a timestamp corresponding to the timestamp of the nonce B.

In operation 1943, the external electronic device 102 may request a communication connection from the electronic device 101 as the nonce A is identified.

In operation 1950, the electronic device 101 and the external electronic device 102 may establish a GATT connection. When Bluetooth pairing is performed through the GATT connection, the electronic device 101 and the external electronic device 102 may release the GATT connection. For example, when the BLE pairing operation is performed thereafter, the electronic device 101 and the external electronic device 102 may re-establish the GATT connection.

Figure 20:
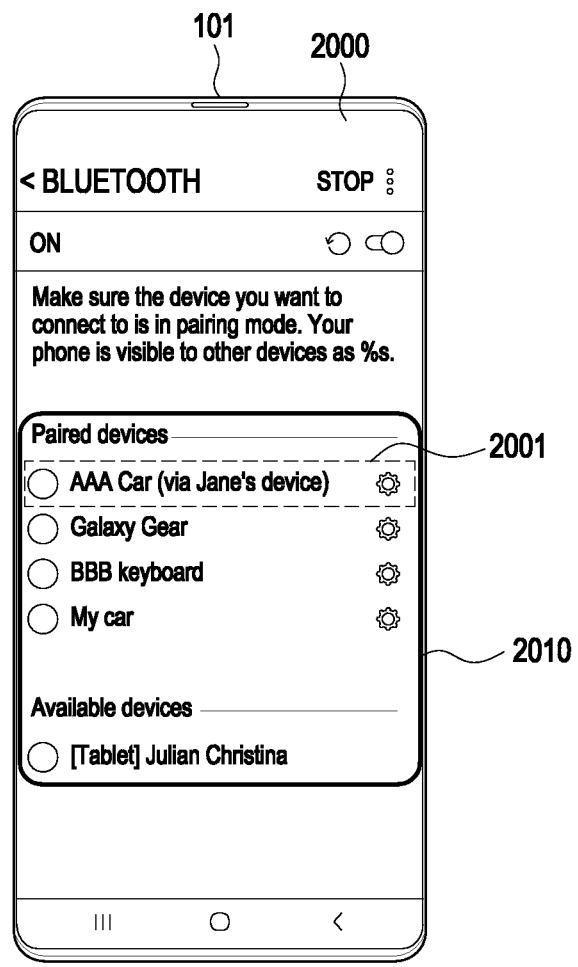
FIG. 20 is a diagram illustrating an example of a screen configuration for notifying a service handover in a P2P service between electronic devices according to an embodiment of the disclosure.

FIG. 20 is a diagram illustrating an example of a screen configuration for notifying a service handover in a P2P service between electronic devices according to an embodiment of the disclosure.

Referring to FIG. 20, the electronic device 101 may notify a user of the service handover through a Bluetooth application related to the P2P service. For example, the service handover notification screen 2000 may be displayed according to execution of the Bluetooth application.

The service handover notification screen 2000 according to various embodiments of the disclosure may display communication scheme information (e.g., 'Bluetooth') according to the service handover or a list 2010 of the electronic device in which the service handover is performed. For example, the electronic device list 2010 may include devices (vehicle device (AAA car) 2001 of the external electronic device 102) connectable to the external electronic device 102 through a corresponding communication scheme.

According to various embodiments of the disclosure, as a user of the electronic device 101 selects the vehicle device 2001 of the external electronic device 102 from the list of electronic devices 2010, the service handover may be performed to the vehicle device 2001 of the external electronic device 102 to perform P2P communication between the electronic device 101 and the vehicle device 2001 of the external electronic device 102.

Figure 21:
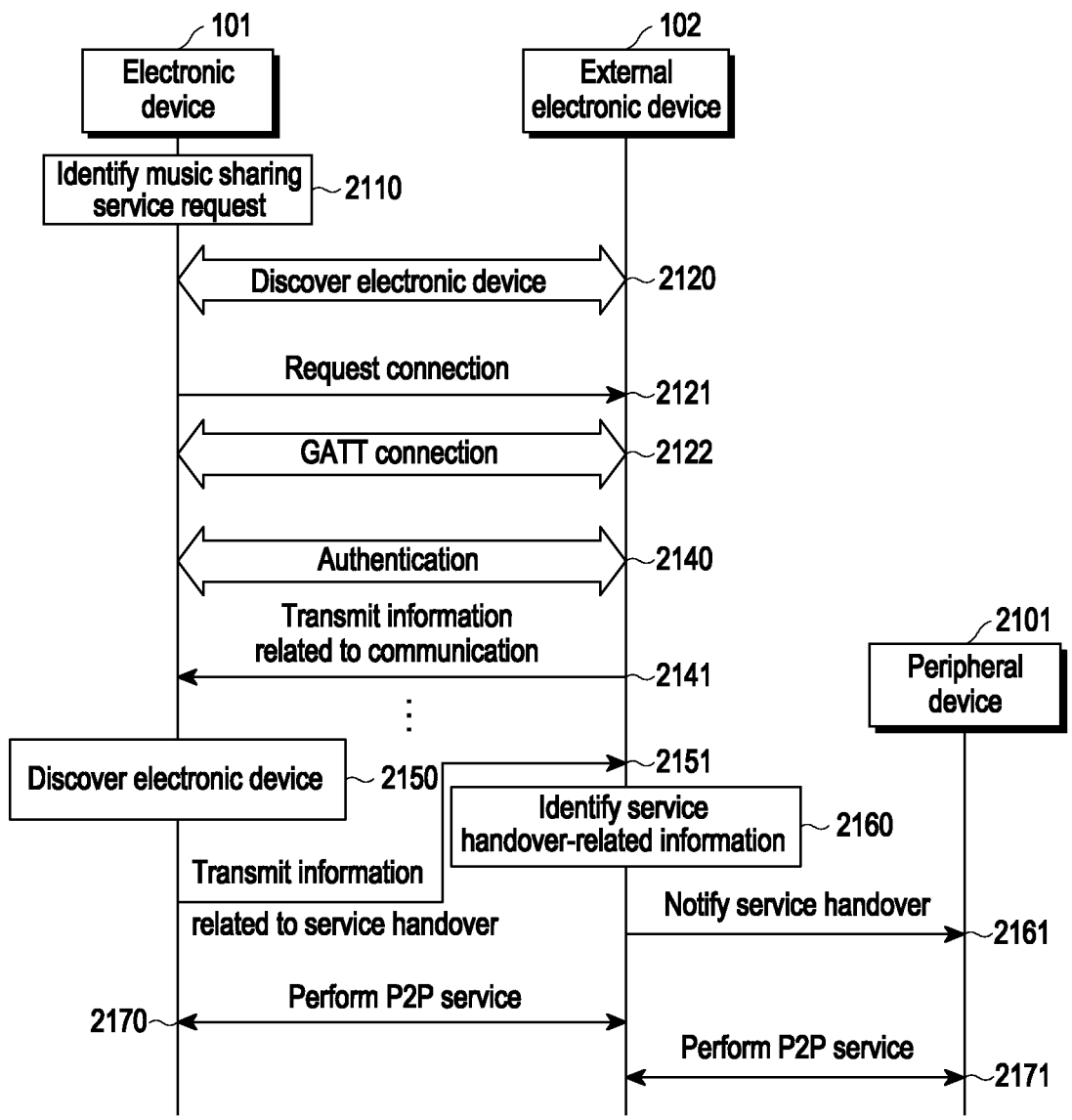
FIG. 21 is a flowchart illustrating an example of an operation of discovering a service handover device in a P2P service between electronic devices according to an embodiment of the disclosure.

FIG. 21 is a flowchart illustrating an example of an operation of discovering a service handover device in a P2P service between electronic devices according to an embodiment of the disclosure.

Referring to FIG. 21, in operation 2110, the electronic device 101 may identify that a music sharing service for outputting the sound source of the electronic device 101 through at least one external electronic device (e.g., 102) is requested.

In operation 2120, the electronic device 101 may discover the external electronic device 102. For example, the external electronic device 102 may determine the external electronic device 102 as a discovered device.

In operation 2121, the electronic device 101 may request a connection for a P2P service from the external electronic device 102.

In operation 2122, the electronic device 101 may establish a GATT connection with the external electronic device 102 in response to the connection request.

According to various embodiments of the disclosure, the electronic device 101 may perform BLE pairing with the external electronic device 102 through the GATT connection, but the P2P service is for outputting the sound source of the electronic device 101 to the Bluetooth A2DP device of the external electronic device, and the pairing operation with the external electronic device 102 may be omitted.

In operation 2140, the electronic device 101 may perform authentication on the external electronic device 102.

In operation 2141, the external electronic device 102 may transmit information related to communication with the external electronic device 102 to the electronic device 101. For example, the information may include information related to a communication scheme connectable with the external electronic device 102 or a communication property.

According to various embodiments of the disclosure, the electronic device 101 may identify whether the external electronic device 102 is located within the communication range based on the exchanged information, but the corresponding P2P service is intended to output a sound source of the electronic device 101 from a device connected to the external electronic device 102 by performing the service handover to the device connected to the external electronic device 102, and the operation of identifying the above-described communication range may be omitted.

In operation 2150, the electronic device 101 may discover the electronic device for service handover. For example, the electronic device 101 may determine a scheme of performing a communication connection with a device (e.g., the peripheral device 2101) for performing the P2P service and a device for performing the P2P service based on information related to communication received from the external electronic device 102.

In operation 2151, the electronic device 101 may transmit information related to the service handover to the external electronic device 102. For example, the service handover-related information may include electronic device information (e.g., the external electronic device 102 or the peripheral device 2101) to perform music sharing service, a communication scheme, or information related to a communication property, based on the communication information exchanged with the external electronic device 102.

In operation 2160, the external electronic device 102 may identify service handover-related information transmitted from the electronic device 101.

In operation 2161, the external electronic device 102 may notify the application of the music sharing service or the service handover to the peripheral device 2101 included in the service handover-related information.

According to various embodiments of the disclosure, the electronic device 101 may identify the peripheral device 2101 (e.g., an A2DP device) of the external electronic device 102 to perform the music sharing service and a communication scheme (e.g., Bluetooth) to perform the music sharing service with the peripheral device 2101 based on the exchanged peripheral information.

In operation 2170, the electronic device 101 and the external electronic device 102 may perform the P2P service.

In operation 2171, the external electronic device 102 may perform the P2P service with the peripheral device 2101. For example, the electronic device 101 may transmit a sound source of the electronic device 101 to the peripheral device 2101 through a Bluetooth connection, and may control the sound source to be output from the peripheral device 2101.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit;
   a security circuit;
   at least one processor operatively connected to the communication circuit and the security circuit; and
   memory operatively connected to the at least one processor,
   wherein the memory stores instructions that, when executed by the at least one processor, cause the electronic device to:
   receive, from an external electronic device, a public key as a peer to peer (P2P) service is requested,
   transmit, to the external electronic device, an authentication certificate chain generated based on the received public key,
   verify an authentication certificate chain received from the external electronic device by using a root authentication certificate stored in the security circuit,
   based on verifying that the authentication certificate chain received from the external electronic device is valid, generate a shared key,
   receive, from the external electronic device, encrypted information on the external electronic device,
   decrypt the encrypted information on the external electronic device by using the shared key, and
   perform the P2P service with the external electronic device through the communication circuit based on the decrypted information on the external electronic device, and
   wherein the encrypted information on the external electronic device is generated in the external electronic device based on a verification of the authentication certificate chain received from the electronic device.

2. The electronic device of claim 1, wherein the instructions cause the electronic device to:
   receive, through the communication circuit, the public key, and
   receive the encrypted information on the external electronic device through a generic attribute profile (GATT) connection with the external electronic device.

3. The electronic device of claim 1,
   wherein the encrypted information on the external electronic device comprises at least a part of a phone number of the external electronic device, and
   wherein the instructions cause the electronic device to:
   decrypt the phone number of the external electronic device with the shared key, and
   identify a validity of the external electronic device by comparing the decrypted value with the phone number of the external electronic device stored in the memory.

4. The electronic device of claim 1, wherein the instructions cause the electronic device to generate the shared key with a same shared key as the external electronic device according to Elliptic-curve Diffie-Hellman (ECDH) rule.

5. The electronic device of claim 1, wherein the instructions cause the electronic device to:
   identify a communication scheme among a plurality communication schemes for establishing the P2P service with the external electronic device based on attribute information of the external electronic device and a type of service requested by a user.

6. A method for performing a peer to peer (P2P) service in an electronic device, the method comprising:
   receiving, from an external electronic device, a public key as the P2P service is requested;
   transmitting, to the external electronic device, an authentication certificate chain generated based on the received public key;
   verifying an authentication certificate chain received from the external electronic device by using a root authentication certificate stored in a security circuit;
   based on verifying that the authentication certificate chain received from the external electronic device is valid, generating a shared key;
   receiving, from the external electronic device, encrypted information on the external electronic device;
   decrypting the encrypted information on the external electronic device by using the shared key; and
   performing the P2P service with the external electronic device based on the decrypted information on the external electronic device,
   wherein the encrypted information on the external electronic device is generated in the external electronic device based on a verification of the authentication certificate chain received from the electronic device.

7. The method of claim 6, further comprising:
receiving the public key and receiving encrypted information on the external electronic device through a generic attribute profile (GATT) connection with the external electronic device.

\* \* \* \* \*